US012662313B2

(12) United States Patent
Mohanarajah et al.

(10) Patent No.: US 12,662,313 B2
(45) Date of Patent: Jun. 23, 2026

(54) METHOD FOR ASSEMBLING RACK AND RACK

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP); Kousuke Yunoki, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 518 days.

(21) Appl. No.: 18/165,379

(22) Filed: Feb. 7, 2023

(65) Prior Publication Data

US 2023/0278792 A1 Sep. 7, 2023

Related U.S. Application Data

(60) Provisional application No. 63/482,805, filed on Feb. 2, 2023, provisional application No. 63/315,563, filed on Mar. 2, 2022.

(51) Int. Cl.
*B65G 1/127* (2006.01)
*B25J 9/16* (2006.01)
(Continued)

(52) U.S. Cl.
CPC ............ *B65G 1/0492* (2013.01); *B25J 9/161* (2013.01); *B25J 9/1674* (2013.01); *B25J 9/1676* (2013.01);
(Continued)

(58) Field of Classification Search
CPC ......... A47B 57/06; A47B 57/08; A47B 57/10; A47B 57/20; A47B 57/26; A47B 57/265;
(Continued)

(56) References Cited

U.S. PATENT DOCUMENTS 6,877,828 B2 * 4/2005 Strong ................. A47B 81/002
280/47.35
2014/0086714 A1 * 3/2014 Malik .................. B65G 1/0492
414/273
(Continued)

FOREIGN PATENT DOCUMENTS

JP       06-024506 A    2/1994
JP     2017-522247 A    8/2017
(Continued)

OTHER PUBLICATIONS

International Search Report and Written Opinion mailed on Apr. 4, 2023 in the PCT Application No. PCT/JP2023/006764.

*Primary Examiner* — Joshua E Rodden
(74) *Attorney, Agent, or Firm* — Trupti P. Joshi

(57) ABSTRACT

A rack includes a plurality of floors each of which stores a plurality of bins for containing items, and allows a transportation robot to run along a surface thereof; and a plurality of support columns supporting the floors. Each of the floors includes a plurality of floor modules making up part of each of the floors, and each of the floor modules is detachably supported by the support column. This method for assembling a rack includes steps of: assembling each of the floors from a lower floor to an upper floor by attaching the floor module to the support column; and detaching the at least one floor module from the support column on each of the floors to secure a route for an operator to go down to the floor of the lower floor from the upper floor in the assembling step.

20 Claims, 21 Drawing Sheets

(51) Int. Cl.

| | |
|---|---|
| *B25J 13/00* | (2006.01) |
| *B65G 1/04* | (2006.01) |
| *B65G 1/06* | (2006.01) |
| *B65G 1/10* | (2006.01) |
| *B65G 1/137* | (2006.01) |
| *G05B 19/418* | (2006.01) |
| *G06Q 10/087* | (2023.01) |
| *B25J 5/00* | (2006.01) |

(52) U.S. Cl.
CPC .......... *B25J 13/006* (2013.01); *B65G 1/0471* (2013.01); *B65G 1/0478* (2013.01); *B65G 1/06* (2013.01); *B65G 1/065* (2013.01); *B65G 1/10* (2013.01); *B65G 1/127* (2013.01); *B65G 1/1371* (2013.01); *B65G 1/1373* (2013.01); *B65G 1/1378* (2013.01); *G05B 19/418* (2013.01); *G06Q 10/087* (2013.01); *B25J 5/007* (2013.01); *B65G 2201/0235* (2013.01); *B65G 2201/0258* (2013.01); *B65G 2203/0233* (2013.01); *B65G 2203/0283* (2013.01); *B65G 2811/0678* (2013.01)

(58) Field of Classification Search
CPC . B25J 5/007; B25J 9/161; B25J 9/1674; B25J 9/1676; B25J 13/006; B65G 1/0471; B65G 1/0478; B65G 1/0492; B65G 1/06; B65G 1/065; B65G 1/10; B65G 1/127; B65G 1/1371; B65G 1/1373; B65G 1/1378; B65G 2201/0235; B65G 2201/0258; B65G 2203/0233; B65G 2203/0283; B65G 2811/0678
USPC ........................ 108/91, 92, 93; 211/162, 189; 312/257.1, 265.1
See application file for complete search history.

(56) References Cited

U.S. PATENT DOCUMENTS

| | | | | |
|---|---|---|---|---|
| 2014/0277693 | A1* | 9/2014 | Naylor | B65G 1/065 |
| | | | | 700/218 |
| 2016/0009493 | A1 | 1/2016 | Stevens et al. | |
| 2017/0267452 | A1 | 9/2017 | Goren et al. | |
| 2019/0202048 | A1* | 7/2019 | Tarbaieva | G05B 19/4185 |
| 2021/0221615 | A1 | 7/2021 | Buchmann | |
| 2021/0347569 | A1* | 11/2021 | Dayrell | B66B 9/003 |
| 2022/0106122 | A1 | 4/2022 | Tie | |
| 2023/0227260 | A1* | 7/2023 | He | B65G 1/0471 |
| | | | | 700/218 |
| 2023/0365335 | A1* | 11/2023 | Ramankutty | B65G 1/0471 |
| 2024/0101349 | A1* | 3/2024 | Hasegawa | B65G 1/065 |
| 2024/0190658 | A1* | 6/2024 | Lindbo | B65G 1/0478 |

FOREIGN PATENT DOCUMENTS

| | | | | |
|---|---|---|---|---|
| JP | 2018-516824 A | 6/2018 | | |
| WO | WO-2016063197 A1 * | 4/2016 | ............ | B65G 1/065 |
| WO | WO 2021/122218 A1 | 6/2021 | | |
| WO | WO 2021/218931 A1 | 11/2021 | | |

* cited by examiner

METHOD FOR ASSEMBLING RACK AND RACK

CROSS-REFERENCE TO RELATED APPLICATIONS

The present application claims the benefit of priority to U.S. Provisional Application No. 63/315,563 filed on Mar. 2, 2022, and U.S. Provisional Application No. 63/482,805 filed on Feb. 2, 2023, the contents of each of which are hereby incorporated by reference in their entirety.

TECHNICAL FIELD

The present disclosure generally relates to a method for assembling a rack and a rack used for a warehouse system such as an Automated Storage and Retrieval System (an ASRS or an AS/RS).

BACKGROUND

As Electronic Commerce (EC) markets expand, improvement of item storage efficiency and item picking work efficiency for logistics has become a great problem. In order to resolve this problem, for example, WO2018/189110 A1 discloses a warehouse. This warehouse is partitioned into a storage area 10 and an order preparation area 11. Rack 100 storing trays 102 for containing storage target products are arranged in the storage area 10. On the other hand, order preparation stations 12 for operators 13 to process orders are arranged in the order preparation area 11.

To process an order, an automated device 103 transports the tray 102 containing an order target product from the rack 100 to the order preparation station 12. Subsequently, in the order preparation area 11, the tray 102 is transported to in front of the operator 13 by, for example, another operator other than the operator 13, or another system (e.g., conveyer). The operator 13 picks the product from the tray 102, and sorts the picked product as a transportation package 14. In such a warehouse, the storage shelves 100 are assembled by using large-scale equipment such as scaffolds and aerial work platforms. A structure enabling easy assembly is demanded.

The present disclosure has been made in light of the above problem, and an object of the present disclosure is to provide a rack assembly method which can easily assemble a rack without requiring large-scale equipment, and the rack.

SUMMARY

In order to achieve the above object, according to one aspect of the present disclosure, a method for assembling a rack is provided, and the method for assembling a rack including a plurality of floors each of which stores a plurality of bins for containing items, and allows a transportation robot to run along a surface thereof, and a plurality of support columns supporting the floors, each of the floors including a plurality of floor modules making up part of the floor, and each of the floor modules being detachably supported by the support column. The method for assembling a rack includes steps of: assembling each of the floors from a lower floor to an upper floor by attaching the floor module to the support column; and keeping the at least one floor module detached from the support column on each of the floors to secure a route for an operator to go down to the floor of the lower floor from the upper floor in the assembling step.

The method for assembling a rack further includes a step of closing the route by the detached floor module on the floor of the upper floor when the operator goes down from the floor of the upper floor to the floor of the lower floor when assembly of all of the floors is completed.

A position of the detached floor module is displaced in a horizontal direction from a position of the floor module detached on the floor above the floor of the upper floor.

The displacement in the horizontal direction corresponds to a space of the one floor module.

The route is formed in a step-like shape.

The floor module can be detached upward from the support column.

Each of the support columns includes a support column module extending between at least the mutually neighboring floors, and the support column module can be coupled to the another support column module in a vertical direction.

The one support column supports corner portions of the plurality of floor modules.

Another aspect of the present disclosure provides a rack, the rack includes: a plurality of floors each of which stores a plurality of bins for containing items, and allows a transportation robot to run along a surface thereof; and a plurality of support columns supporting the floors, each of the floors includes a plurality of floor modules making up part of each of the floors, and each of the floor modules is detachably supported by the support column.

The floor module can be detached upward from the support column.

Each of the support columns includes a support column module extending between at least the mutually neighboring floors, and the support column module can be coupled to the another support column module in a vertical direction.

The one support column supports corner portions of the plurality of floor modules.

DESCRIPTION OF EMBODIMENTS

Figure 1:
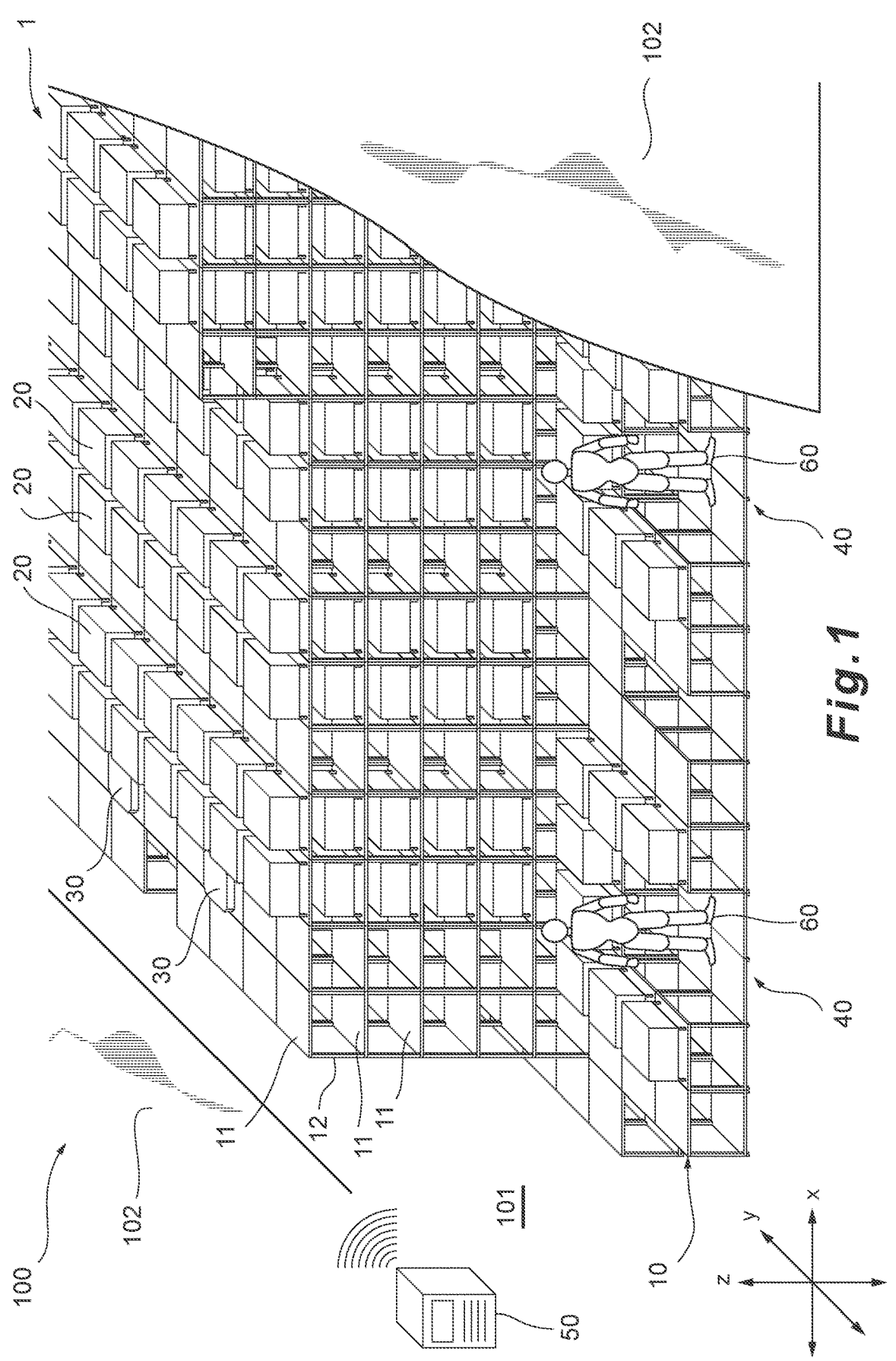
FIG. 1 is a perspective view schematically illustrating an external appearance of an automated storage and retrieval system 1 according to an embodiment of the present disclosure.

Hereinafter, an embodiment of the present disclosure will be described with reference to the accompanying drawings. In all drawings, identical reference numerals are used to refer to identical or similar components. The following embodiment does not intend to limit the invention recited in the claims. Examples and features of the disclosed principal will be described in this description, yet can be changed and modified without departing from the idea and the scope of the disclosed embodiment. Furthermore, specific features, structures, or characteristics can be combined by an arbitrary appropriate method in one or more embodiments. The following detailed description is taken into account only as exemplary description, and the true range and idea are intended to be indicated by the claims.

FIG. 1 is a perspective view schematically illustrating an external appearance of an automated storage and retrieval system 1 according to an embodiment of the present disclosure. The automated storage and retrieval system 1 is constructed in, for example, a building 100. The building 100 includes a floor surface 101 extending along a horizontal plane, a plurality of sidewalls 102 vertically standing from the floor surface 101, and a ceiling (not illustrated) supported by the plurality of sidewalls 102. For example, the four sidewalls 102 surrounding four sides, and the ceiling extending in parallel to the floor surface 101 establish an internal space between the floor surface 101, and the sidewalls 102 and the ceiling. The automated storage and retrieval system 1 is constructed in this internal space. Note that part of the sidewalls 102 are cut out for ease of description in FIG. 1. In the building 100, an x axis and a y axis extending in a direction perpendicular to each other on the horizontal plane, and a z axis extending in a vertical direction and perpendicular to the x axis and the y axis are defined.

The automated storage and retrieval system 1 is an automated storage and retrieval system which can automate a series of work from warehousing and storage to delivery of items including products and the like based on centralized management. The automated storage and retrieval system 1 according to the present embodiment includes a rack 10 arranged on the floor surface 101, a plurality of storage bins 20 which is a container stored in the rack 10, a plurality of transportation robots 30 for transporting the storage bins 20, one or more picking stations 40 for picking items including products and the like contained in the storage bins 20, and a management server 50 for managing the series of work of the automated storage and retrieval system 1. At the picking station 40, a human operator 60 performs picking work of picking an item from the storage bin 20.

The rack 10 includes a plurality of floors 11, each of floors 11 defining a surface which extends in parallel to each other along each xy plane, and a plurality of support columns 12 supporting the plurality of floors 11. In the present embodiment, the floors 11 of a first floor to a ninth floor vertically standing in a z axis direction from the floor surface 101 are formed. A total height of the rack 10 from the floor surface 101 in the z axis direction can be set according to a height in the z axis direction of the ceiling of the building 100. Note that part of the floors 11 of the eighth floor and the ninth floor is omitted for ease of description in FIG. 1, and configurations of the floors 11 of the eighth floor and the ninth floor are configured similar to the floor 11 of the seventh floor.

Figure 2:
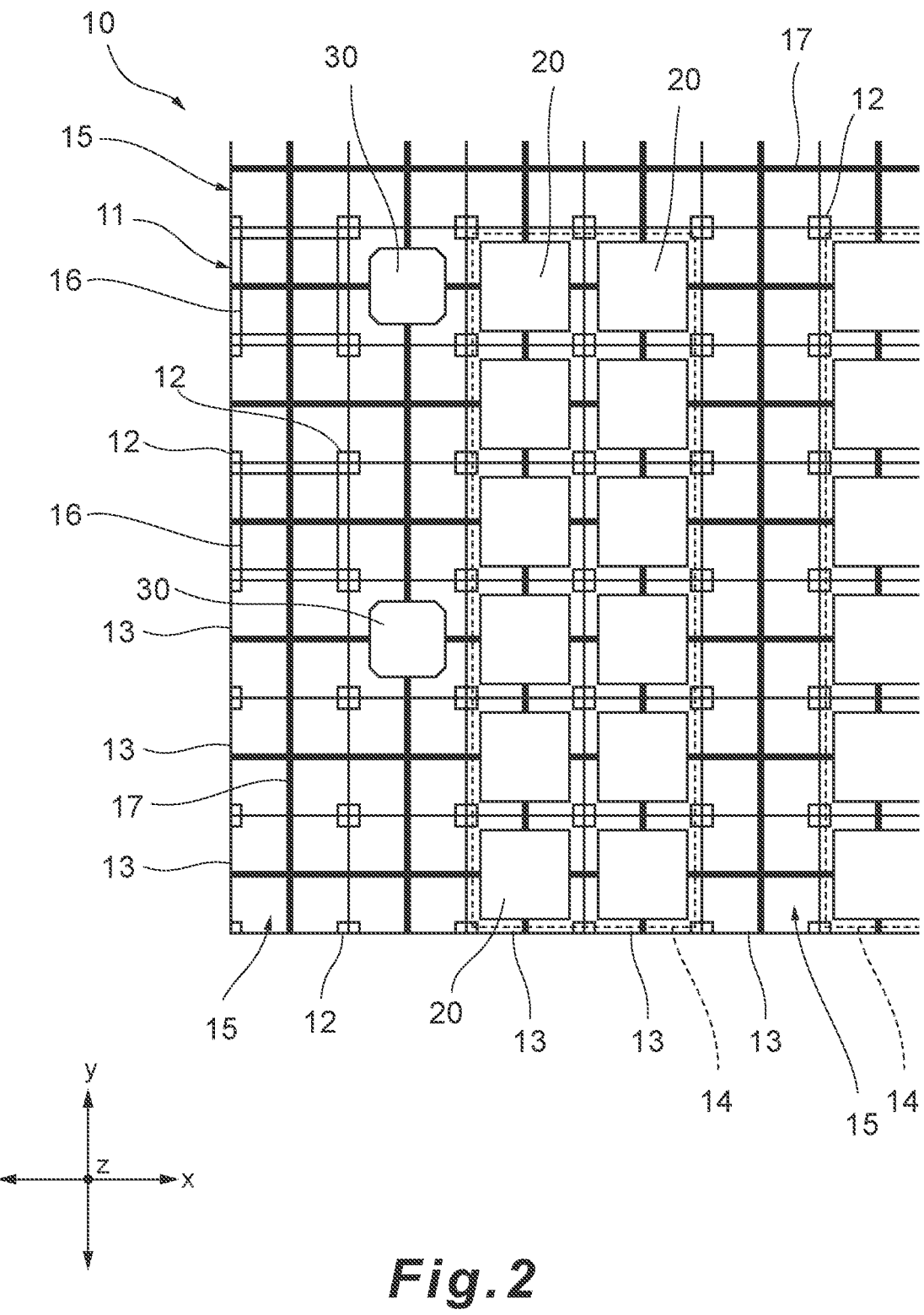
FIG. 2 is a plan view schematically illustrating an example of a structure of floors 11 of a rack 10 of the automated storage and retrieval system 1 according to the present embodiment.

FIG. 2 is a plan view schematically illustrating an example of a structure of the floor 11 of the rack 10 of the automated storage and retrieval system 1 according to the present embodiment. In the present embodiment, each floor 11 of the rack 10 defines a plurality of sections 13 which are aligned along the xy plane. The section 13 defines, for example, outlines of a square or a rectangle in plan view. In the present embodiment, the support columns 12 are respectively arranged at four corners of the one section 13. The one storage bin 20 occupies the one section 13. Similarly, the one transportation robot 30 occupies the one section 13. That is, an outline of the storage bin 20 and an outline of the transportation robot 30 are respectively arranged in the outline of the one section 13 in plan view. Furthermore, an interval between a pair of the mutually neighboring support columns 12 and 12 is set larger than widths of the transportation robot 30 and the storage bin 20 defined in an x axis direction and a y axis direction.

Each floor 11 defines storage areas 14 including the sections 13 in which the storage bins 20 are aligned, and movement routes 15 of the transportation robots 30 including the sections 13 other than the storage areas 14. In the illustrated example, for example, two rows of bin groups of the plurality of storage bins 20 aligned along the y axis direction are aligned in the x axis direction in the storage area 14. That is, all of the storage bins 20 making up the bin group of these two rows of the storage bins 20 face the movement routes 15 at all times. On the other hand, the transportation robots 30 can run on the movement routes 15. As described later, the transportation robot 30 can also run in the storage area 14, through a space below a bottom surface of the storage bin 20.

Figure 3:
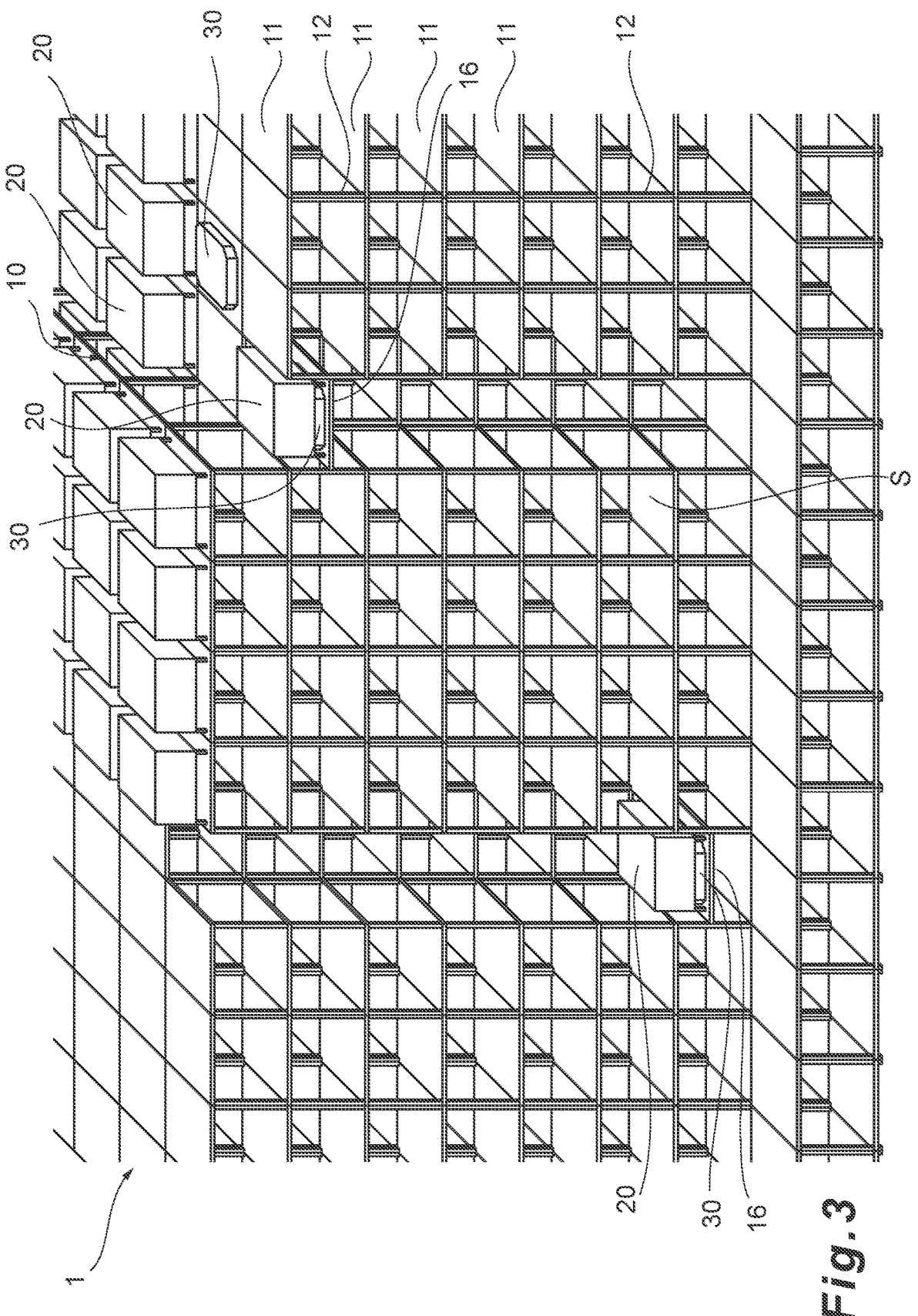
FIG. 3 is a perspective view schematically illustrating an example of a structure of the rack 10 of the automated storage and retrieval system 1 according to the embodiment.

FIG. 3 is a perspective view schematically illustrating an example of a structure of the rack 10 of the automated storage and retrieval system 1 according to the embodiment. Referring to FIGS. 1 to 3 together, the rack 10 includes one or more transportation elevators 16. The transportation elevators 16 can make reciprocating movement in the z axis direction from the first floor to the ninth floor of the floors 11, and stop each floor 11. Each transportation elevator 16 is arranged in one section in the movement route 15 of the transportation robot 30 on each floor 11. In the present embodiment, the plurality of transportation elevators 16 may be provided to the rack 10. The transportation elevator 16 can have only the transportation robot 30 get thereon or have the transportation robot 30 holding the storage bin 20 get thereon to transport to each floor of the first floor to the ninth floor.

The transportation elevator 16 includes, for example, shafts of four corners attached to the rack 10 and extend in the z axis direction, four roller chains attached to the respective shafts, and extend in the z axis direction, four sprockets meshing with the respective chains, and two electric motors (both of which are not illustrated) for respectively rotating and driving, for example, the two sprockets. The sprockets mesh with the roller chains in response to rotation of the sprockets caused by the electric motors to ascend and descend the transportation elevator 16. Note that the support columns 12 making up the rack 10 may be used in place of the shafts. The above mechanism is a mere example, and an arbitrary another mechanism realizing vertical movement of the transportation elevator 16 may be used.

Figure 4:
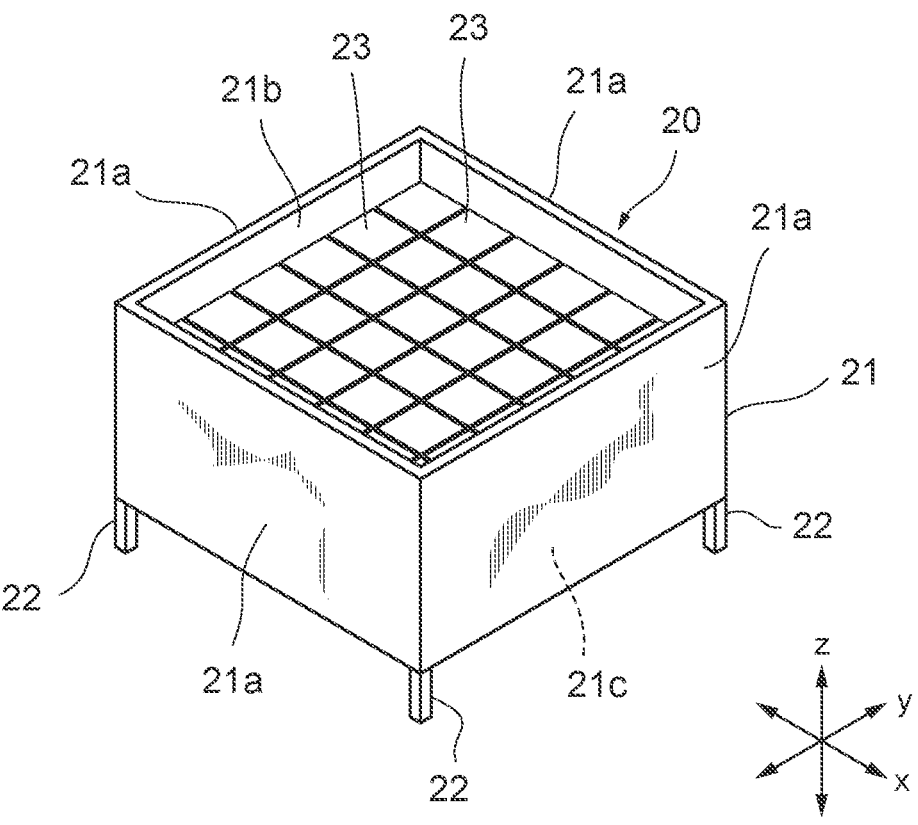
FIG. 4 schematically illustrates an example of a structure of a storage bin 20 of the automated storage and retrieval system 1 according to the embodiment.

FIG. 4 schematically illustrates an example of the structure of the storage bin 20 of the automated storage and retrieval system 1 according to the embodiment. In the present embodiment, the storage bin 20 includes a bin main body 21 defining an internal space of, for example, a cuboid, and four support legs 22 extending downward from four corners of a bottom surface of the bin main body 21. The bin main body 21 includes four sidewalls 21a surrounding four sides, an opening part 21b opened along upper ends of the sidewalls 21a, and a bottom surface 21c closed along lower ends of the sidewalls 21a. Although the opening part 21b is opened in the present embodiment, the opening part 21b may be closed with, for example, a lid or a cover. The sidewalls 21a extend along the xz plane or the yz plane. Furthermore, the bottom surface 21c extends along the xy plane. The storage bin 20 is in contact with the floor 11 with the four support legs 22. The storage bin 20 may be formed by, for example, a resin material. Furthermore, the storage bin 20 may be a foldable bin. An outline of the bin main body 21 in plan view is defined as a square or a rectangle. A size of the storage bin 20 is preferably set appropriately based on a size of the rack 10 or each floor 11 or a size of an item 23.

The one or more items 23 are contained in the internal space in the bin main body 21. The item 23 can be identified by, for example, a unique Stock Keeping Unit (SKU) set to the item 23. Although the item 23 is, for example, one unit of a product or the like, the item 23 may be a so-called case product packaged in a unit of a plurality of identical products. Furthermore, the one storage bin 20 may contain only the items 23 of one type, or may contain the items 23 of a plurality of types. The storage bin 20 can be identified based on a unique ID set to each storage bin 20. The unique ID of this storage bin 20 is managed in correspondence with the SKU of the item 23 contained in the storage bin 20.

Figure 5:
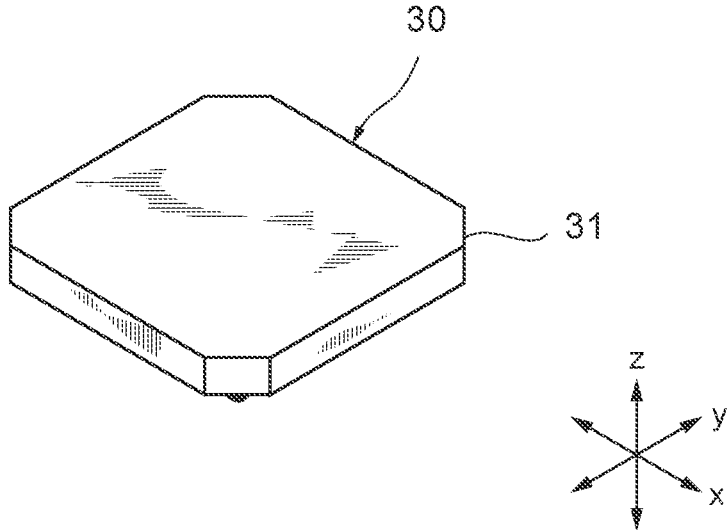
FIG. 5 is a perspective view schematically illustrating an external appearance of a transportation robot 30 of the automated storage and retrieval system 1 according to the embodiment.

FIG. 5 is a perspective view schematically illustrating an external appearance of the transportation robot 30 of the automated storage and retrieval system 1 according to the embodiment. In the present embodiment, a plurality of the transportation robots 30 is preferably arranged on each floor 11 of the rack 10. The transportation robot 30 is, for example, an autonomous running transportation robot including a thin housing 31 of a substantially cuboid shape.

The housing 31 is formed by, for example, a resin material. The transportation robot 30 can run along a line 17 (see, for example, FIG. 2) by tracing the line 17 drawn on the floor 11 of the rack 10 (line tracing function). The line 17 is two strips of lines which extend passing center positions of the x axis direction and the y axis direction in, for example, each section 13, and are perpendicular to each other at a center of the section 13. These lines 17 are drawn in all of the sections 13 including the storage areas 14, the movement routes 15, and the transportation elevators 16 of the floor 11.

An upper surface of the housing 31 of the transportation robot 30 extends flat along the xy plane. A height of the transportation robot 30 is set smaller than the height of the support leg 22 of the storage bin 20. Furthermore, an outline of the housing 31 in top view is defined substantially as, for example, a square. Similarly, the length of one side of the transportation robot 30 is set smaller than the length of each side of the storage bin 20. That is, the transportation robot 30 can enter the space below the bin main body 21 from between the pair of mutually neighboring support legs 22 of the storage bin 20. In this regard, the size of the transportation robot 30 is preferably set appropriately based on sizes of the rack 10, each floor 11, and the storage bin 20.

Figure 6:
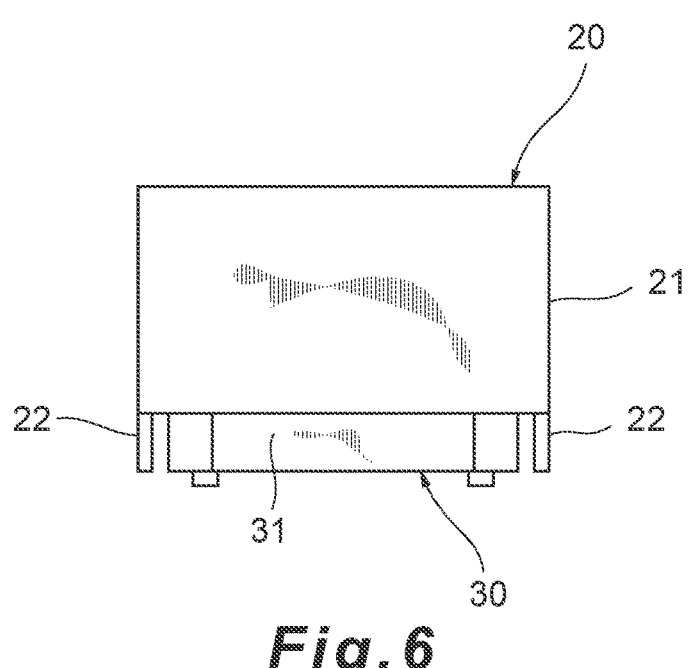
FIG. 6 is a side view illustrating a state where the transportation robot 30 of the automated storage and retrieval system 1 according to the embodiment lifts the storage bin 20.

The transportation robot 30 can change the height thereof between a first configuration where the height of the upper surface of the housing 31 is set to a first height, and a second configuration where the height is set to a second height higher than the first height. As described above, the transportation robot 30 of the first configuration can enter the space below the bin main body 21 from between the pair of mutually neighboring support legs 22 of the storage bin 20. In this case, when the transportation robot 30 changes the height of the housing 31 from the first configuration to the second configuration, the transportation robot 30 holds the storage bin 20 on the upper surface of the housing 31 as illustrated in FIG. 6. As a result, the storage bin 20 can be lifted from the floor 11. The transportation robot 30 can run in both of the first configuration and the second configuration. That is, the transportation robot 30 can run on the floor 11 while lifting the storage bin 20.

Back to FIG. 1, in the present embodiment, the picking station 40 is established along, for example, a peripheral edge of the floor 11 which continues from the surface of the floor 11 of the rack 10. That is, the picking station 40 is established in, for example, the rack 10. In the present embodiment, for example, the two picking stations 40 are established on the floor 11 of the second floor of the rack 10. The picking station 40 is a station for picking the item 23 from the storage bin 20 transported by the transportation robot 30 from the rack 10. The operator 60 can execute picking work (delivery work) taking a standing posture on, for example, the surface of the floor 11 of the first floor. Note that details of a configuration of the picking station 40 will be described later.

The management server 50 manages all of the rack 10, the storage bins 20, the transportation robots 30, the transportation elevators 16, and the picking stations 40 for warehousing, storage, and delivery of the automated storage and retrieval system 1. This management is realized when a program stored in a storage unit is executed by a control unit as described later. More specifically, operations and processing of the transportation robots 30, the transportation elevators 16, and the picking stations 40 are executed according to information processing described in the program. That is, the information processing described in the program functions as specific means collaborated by software in correspondence with the program, and various hardware resources of the automated storage and retrieval system 1 when the program is read by the control unit.

Figure 7:
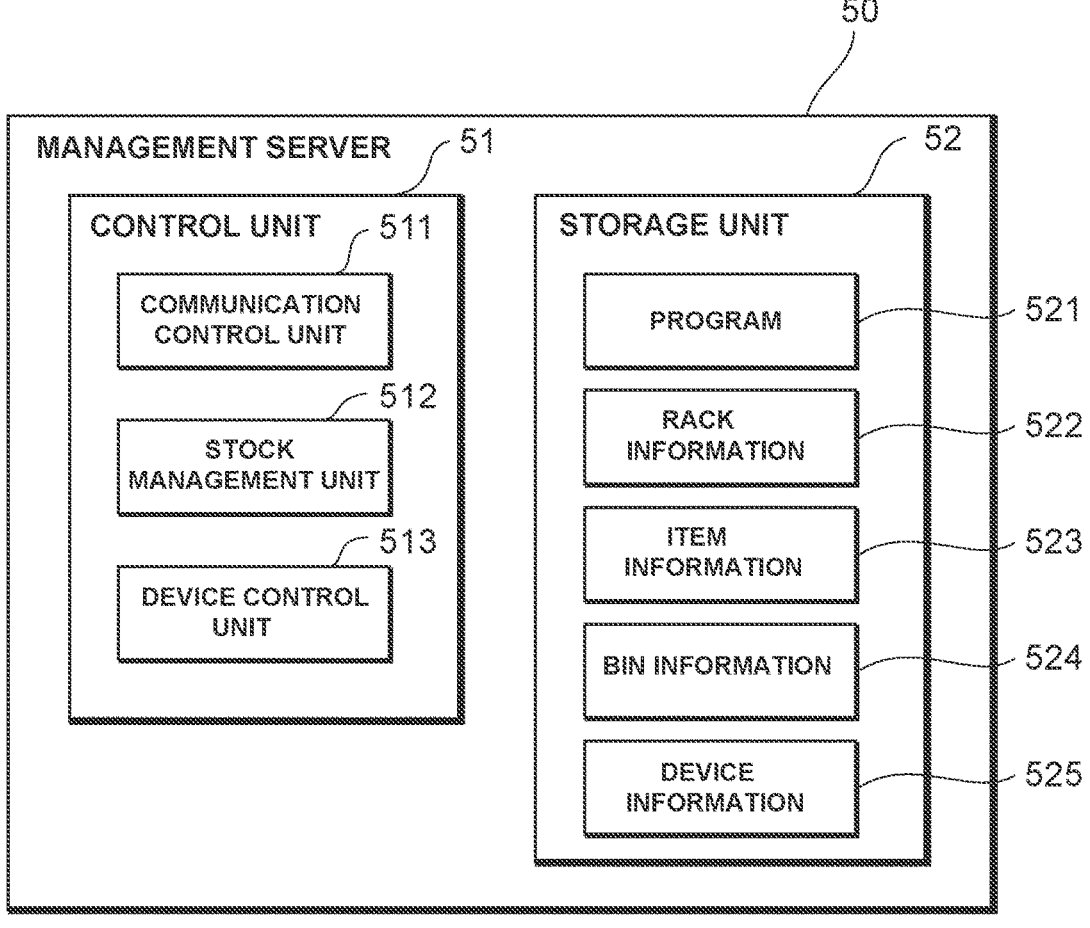
FIG. 7 is a functional block diagram schematically illustrating a configuration of a management server 50.

FIG. 7 is a functional block diagram schematically illustrating a configuration of the management server 50. As illustrated in FIG. 7, the management server 50 includes a control unit 51 and a storage unit 52. The control unit 51 includes a communication control unit 511, a stock management unit 512, and a device control unit 513. On the other hand, the storage unit 52 stores a program 521, rack information 522, item information 523, bin information 524, and device information 525. The control unit 51 manages the automated storage and retrieval system 1 by executing the program 521 stored in the storage unit 52. This management server 50 may be realized on a physical server, yet may be realized on, for example, a cloud server.

The communication control unit 511 controls communication between the management server 50 and at least the transportation robot 30 and a terminal of the operator 60 at the picking station 40. A communication method may be, for example, Wi-Fi (registered trademark), Ethernet (registered trademark), optic or the like. The stock management unit 512 manages a stock status of the automated storage and retrieval system 1. More specifically, the stock management unit 512 associates and manages information (SKU) for identifying each item 23, information related to the number of stocks of each item 23 specified based on the SKU, information (ID) for identifying the storage bin 20 in which the item 23 is stored, and information related to a position of the section 13 of the floor 11 in which the storage bin 20 is stored. Each of these pieces of information is stored as the rack information 522, the item information 523, and the bin information 524 in the storage unit 52.

The device control unit 513 manages and controls at least states and operations of the transportation robots 30 and the picking stations 40. More specifically, the device control unit 513 associates and manages information for identifying the transportation robot 30, information related to a current state of the transportation robot 30, i.e., a charging state of the transportation robot 30, information related to whether or not the transportation robot 30 engages in transportation, information related to order processing in which the transportation robot 30 engages in a case where the transportation robot 30 engages in the transportation, and information related to a current position of the transportation robot 30 at the floor 11 of the rack 10 or the picking station 40. The information related to the order processing includes, for example, information related to transportation of which item 23 of the order processing the transportation robot 30 engages in. Each of these pieces of information is stored as the device information 525 in the storage unit 52. Furthermore, the device control unit 513 associates and manages information for identifying the picking station 40, and information related to an order for which picking work is executed at the picking station 40. Each of these pieces of information is stored as the device information 525 in the storage unit 52.

Furthermore, the device control unit 513 generates commands for the transportation robot 30 and the transportation elevator 16 per order processed by the automated storage and retrieval system 1. More specifically, the device control unit 513 specifies the storage bin 20 for containing the item 23 designated by the order based on each of the above pieces of information, and specifies the transportation robot 30 which needs to be assigned to transport the storage bin 20. The device control unit 513 specifies a movement route R1 (referred to as a "robot route" below) of the transportation robot 30 to the section 13 in which the storage bin 20 is stored, and a movement route R2 (referred to as a "bin route" below) of the transportation robot 30 from the section 13 to the picking station 40 which is a destination. These pieces of generated information are transmitted as commands to the transportation robot 30 via the communication control unit 511.

Figure 8:
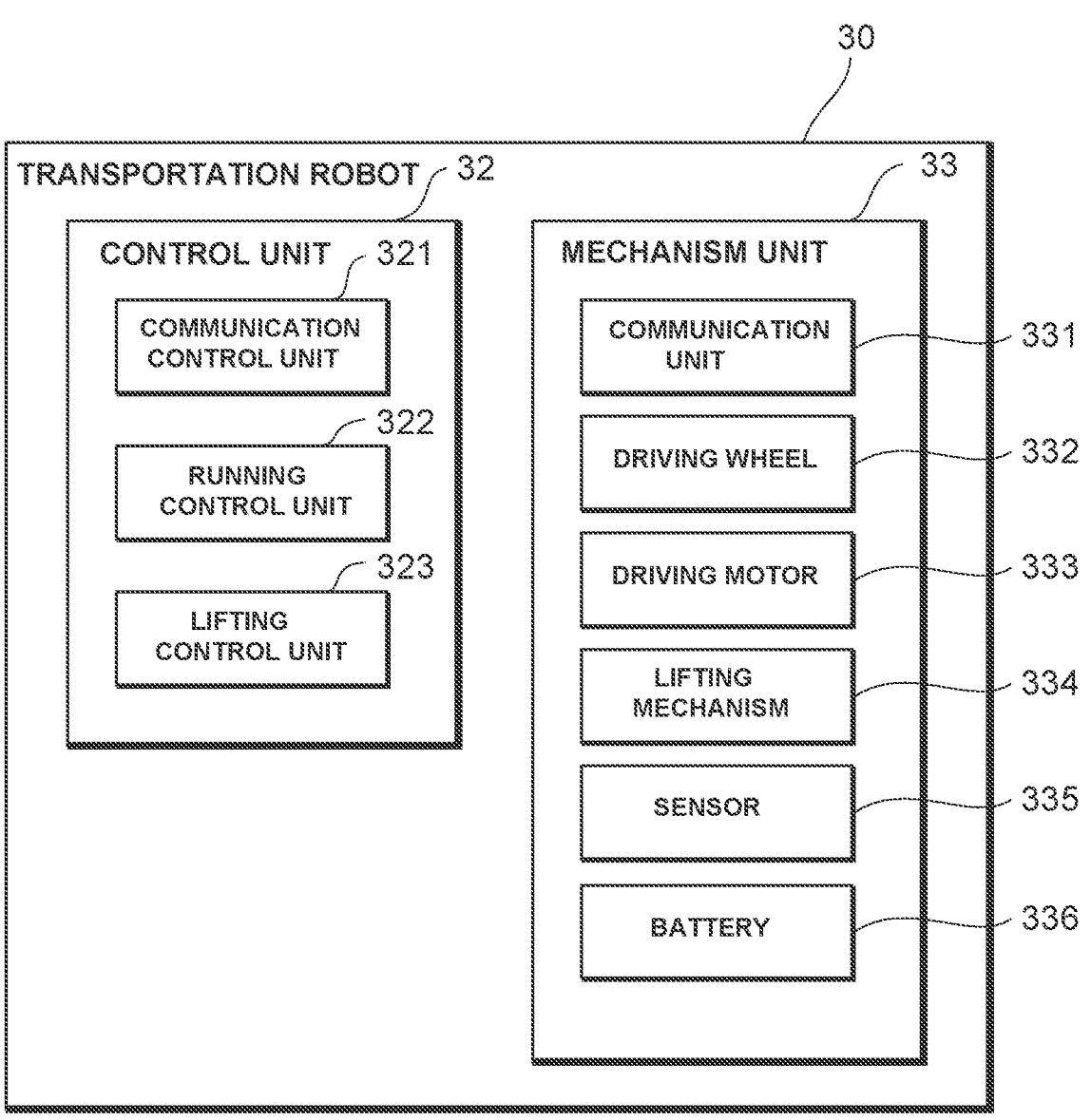
FIG. 8 is a functional block diagram schematically illustrating a configuration of the transportation robot 30.

FIG. 8 is a functional block diagram schematically illustrating a configuration of the transportation robot 30. As illustrated in FIG. 8, the transportation robot 30 includes a control unit 32 and a mechanism unit 33. The control unit 32 includes a communication control unit 321, a running control unit 322, and a lifting control unit 323. The mechanism unit 33 includes a communication unit 331, a plurality of driving wheels 332, a plurality of driving motors 333, a lifting mechanism 334, a sensor 335, and a battery 336. The control unit 32 controls an operation of the transportation robot 30 by executing a program (not illustrated) stored in the storage unit (not illustrated). The program may be stored in a physical storage unit incorporated in the transportation robot 30, yet may be stored on, for example, a cloud server.

The communication unit 331 establishes communication between at least the management server 50, the transportation elevator 16, and the terminal of the operator 60 at the picking station 40. A communication method may be, for example, Wi-Fi (registered trademark), Ethernet (registered trademark), optic or the like. Communication performed by the communication unit 331 is controlled by the communication control unit 321. The driving wheel 332 is a wheel for realizing running of the transportation robot 30. The plurality of driving motors 333 drive the driving wheels 332 and the lifting mechanism 334. Driving of the driving wheels 332 is controlled by the running control unit 322. The lifting mechanism 334 establishes the above-described first configuration and second configuration by lifting the housing 31 of the transportation robot 30. An operation of this lifting mechanism 334 is controlled by the lifting control unit 323.

The sensor 335 is, for example, an optical sensor for realizing the above-described line tracing function. More specifically, the sensor 335 is used to control running of the transportation robot 30 along the line 17 by reading a boundary of the line 17 drawn on each section 13. Furthermore, although the two strips of the lines 17, 17 cross at the center of each section 13, the sensor 335 reads the line 17 perpendicular to the line 17 along which the transportation robot 30 is running, so that the transportation robot 30 can specify the center position of each section 13. Thus, the transportation robot 30 can stop at, for example, the center position of each section 13. The battery 336 is, for example, a rechargeable battery. On each floor 11 of the rack 10, one or more charging spots (not illustrated) which enable charging of the battery 336 of the transportation robot 30 may be formed.

Figure 9:
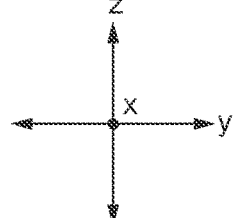
FIG. 9 is a side view of the rack 10 schematically illustrating an example of a configuration of a picking station 40 of the automated storage and retrieval system 1 according to the embodiment.
Figure 10:
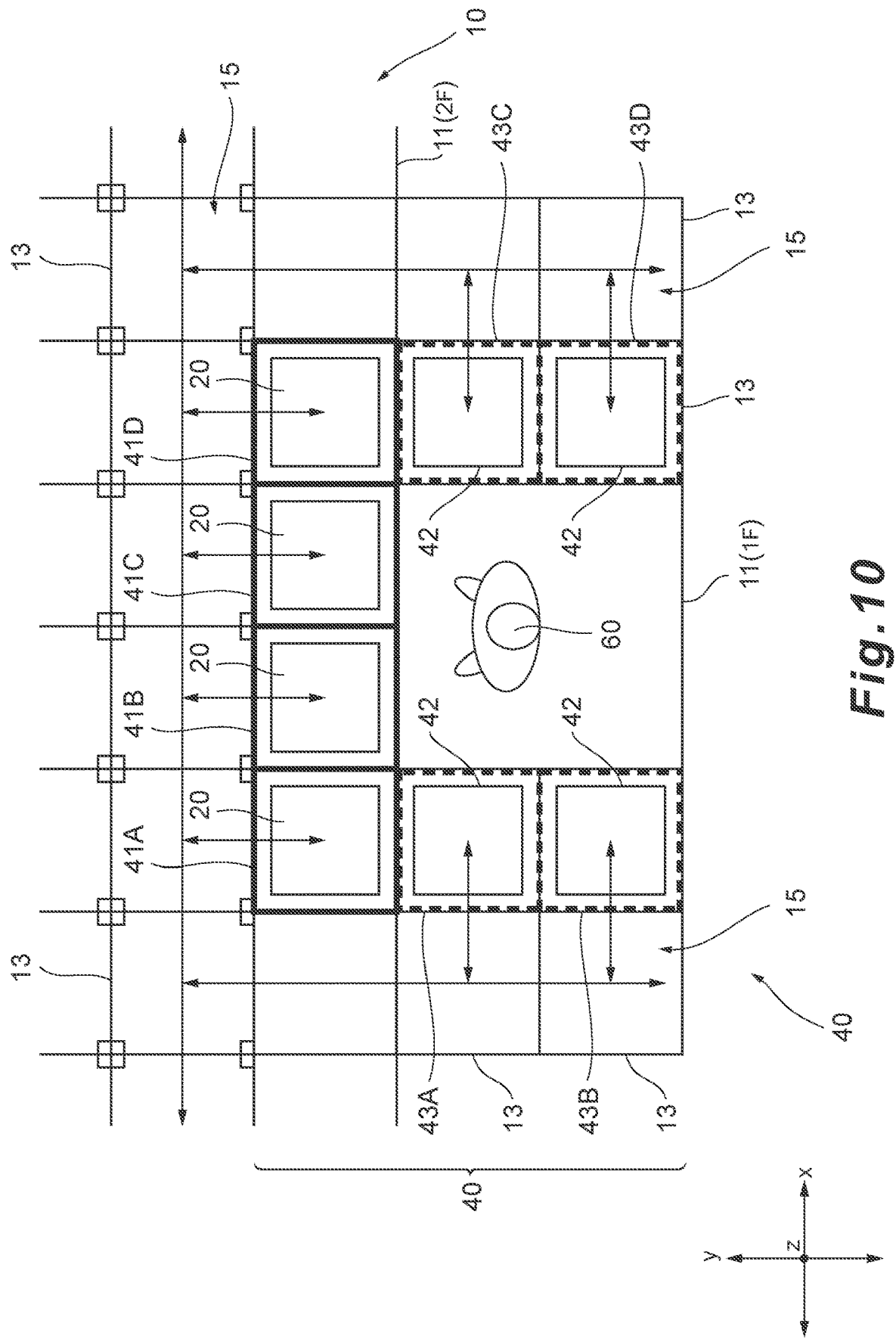
FIG. 10 is a plan view of the rack 10 schematically illustrating an example of a configuration of the picking station 40 of the automated storage and retrieval system 1 according to the embodiment.

FIG. 9 is a side view of the rack 10 schematically illustrating an example of the configuration of the picking station 40 of the automated storage and retrieval system 1 according to the embodiment. FIG. 10 is a plan view of the rack 10 schematically illustrating the example of the configuration of the picking station 40 of the automated storage and retrieval system 1 according to the embodiment. As illustrated in FIG. 9, the picking station 40 is established along the peripheral edge of the floor 11 which continues from the surface of the floor 11 of the second floor of the rack 10. More specifically, the picking station 40 is formed on the surface of the floor 11 of the second floor which extends in, for example, the y axis direction toward an outer side of an outer peripheral edge of the floors 11 of the third floor to the ninth floor. In the present embodiment, similar to the floor 11 of the second floor, the floor 11 of the first floor also extends toward the outer side of the outer peripheral edges of the floors 11 of the third floor to the ninth floor. The operator 60 stands on the surface of the floor 11 of the first floor, and does work of picking the item 23 from the storage bin 20. The height of the surface of the floor 11 of the second floor is suitable for the operator 60 whose height is, for example, 165 cm which is an average height of adults to do the work.

As illustrated in FIG. 10, the picking station 40 defines a plurality of picking positions 41A to 41D at which the storage bins 20 used for picking work of the item 23 are arranged on the floor 11 of the second floor. In the present embodiment, the four picking positions 41A to 41D are aligned adjacent to each other in the x axis direction along the peripheral edge of the rack 10. Each of the picking positions 41A to 41D occupies the one section 13 of the floor 11. The picking positions 41A to 41D are aligned in front of the operator 60 facing the rack 10, and the picking positions 41B and 41C of the picking positions 41A to 41D directly face the operator 60. As is apparent from FIG. 9, no floor 11 is arranged in a space above the picking positions 41A to 41D in the z axis direction.

On the floor 11 of the second floor, for example, the two sections 13 extend toward the outer side in the y axis direction from the picking positions 41A and 41D. These four sections 13 in total define loading positions 43A to 43D at which the items 23 are loaded to shipment bins 42 which need to be shipped to clients of orders. Each of the loading positions 43A to 43D occupies the one section 13 of the floor 11. The shipment bin 42 employs the same configuration as that of the storage bin 20. According to the present embodiment, all of the loading positions 43A to 43D are aligned to a side of the operator 60 who faces the rack 10, and directly face the operator 60. Thus, as is clear from FIG. 10, the four picking positions 41A to 41D and the four loading positions 43A to 43D are aligned surrounding the operator 60 on the floor 11 of the second floor.

Furthermore, the sections 13 further surrounding the four picking positions 41A to 41D and the four loading positions 43A to 43D define the movement route 15 of the transportation robot 30 on the floor 11 of the second floor. Although FIG. 10 omits illustration of the lines 17 for ease of description, the lines 17 are drawn in all of the sections 13 in which the four picking positions 41A to 41D and the four loading positions 43A to 43D, and the movement routes 15 are formed. Thus, as indicated by arrows in FIG. 10, the transportation robot 30 can enter the four picking positions 41A to 41D and the four loading positions 43A to 43D from the movement routes 15. Note that the storage bin 20 is not arranged in the sections 13 forming the movement routes 15. Thus, the transportation robot 30 can transport the storage bin 20 between the storage area 14 of the rack 10 and the four picking positions 41A to 41D. On the other hand, the transportation robot 30 can transport the shipment bin 42 on which the item 23 has been loaded, to, for example, a shipping station (not illustrated) established in the rack 10.

Although the storage bins 20 are aligned on each floor 11 of the rack 10 as is apparent from FIG. 9, the storage bins 20 for containing the items 23 of higher inventory turnover ratios are preferably aligned on the lower floors 11. In other words, the storage bins 20 for containing the items 23 of lower inventory turnover ratios are preferably aligned in the upper floors 11. In the present embodiment, the picking stations 40 are established on the floor 11 of the second floor, and therefore the items 23 of lower inventory turnover ratios are stored on the upper floors 11 for which physical movement distances of the transportation robots 30 from the second floor are assumed to be long. Similarly, the items 23 of higher inventory turnover ratios are stored on the floors 11 which are close to the second floor and to which physical movement distances are assumed to be short, or the second floor for which the transportation elevator 16 does not need to be used. Furthermore, the picking stations 40 are not limited to the picking stations provided adjacent to the floor 11 of the second floor. The picking stations 40 may be provided adjacent to the other floors 11 likewise according to installation environment such as a shape, a size, and the like of a warehouse in which the automated storage and retrieval system 1 is installed, or a control mode or the like of the automated storage and retrieval system 1. Furthermore, the automated storage and retrieval system 1 may be provided with the plurality of picking stations 40. Furthermore, the picking positions are not limited to the above-described four picking positions 41A to 41D, and the loading positions are not limited to the above-described four loading positions 43A to 43D.

Figure 11:
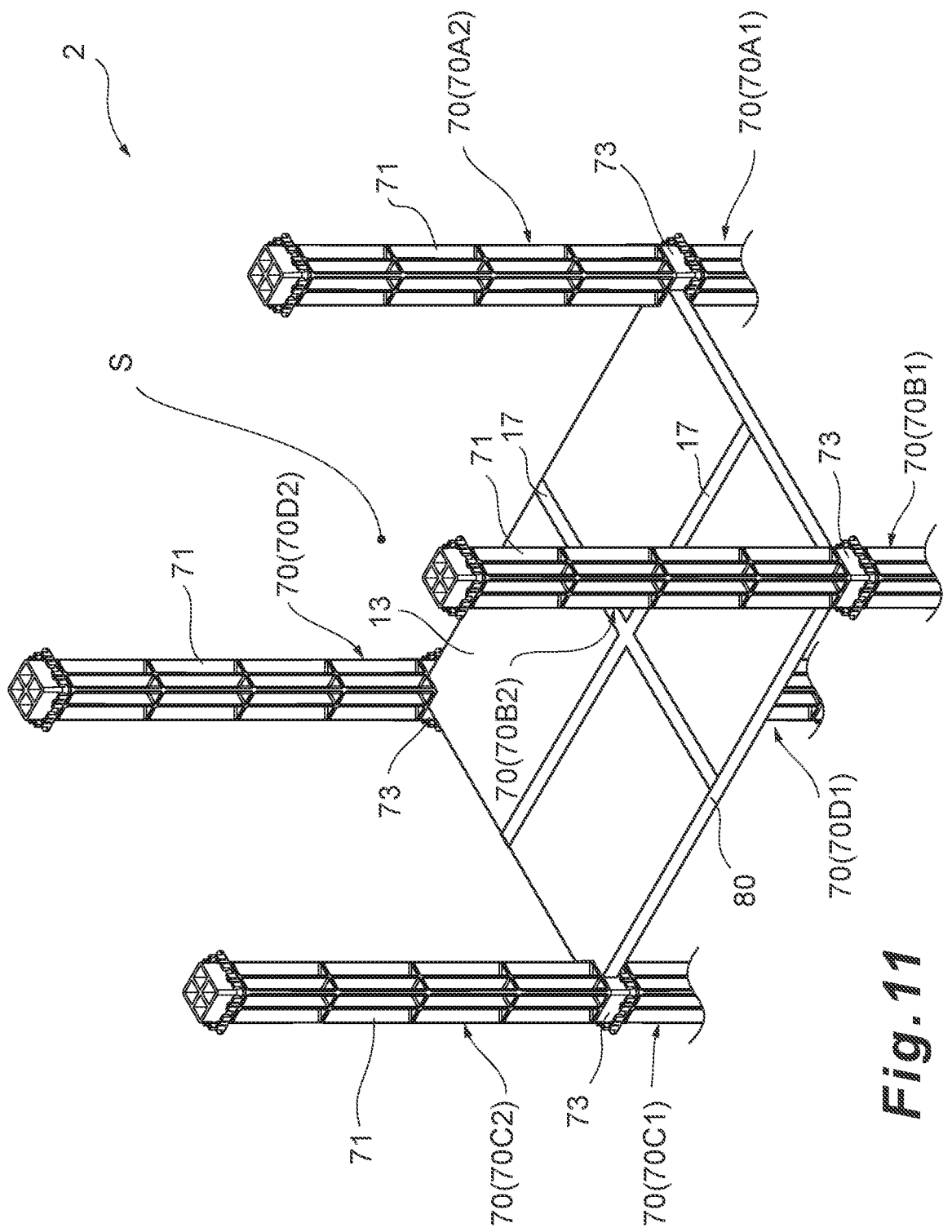
FIG. 11 is a flowchart for explaining processing of a control unit 51 of the management server 50 of the automated storage and retrieval system 1 according to the embodiment.

Next, a configuration of the rack 10 will be specifically described. FIG. 11 is a perspective view illustrating a schematic configuration of a rack module 2 included in the rack 10. The rack 10 includes the plurality of rack modules 2, and is formed by connecting the plurality of rack modules 2. Furthermore, as described above, the rack 10 stores the plurality of storage bins 20, and includes the plurality of floors 11 allowing the transportation robots 30 to run along surfaces thereof. The rack module 2 includes a floor module 80 which is part of each floor 11, and a plurality of support column modules 70 supporting the floor module 80. A configuration of the rack module 2 will be specifically described below.

The rack module 2 is a minimum unit structure making up the rack 10, and the rack 10 is formed by the plurality of rack modules 2. More specifically, the rack 10 is formed by coupling the plurality of rack modules 2 in a horizontal direction and the vertical direction. The rack module 2 forms a zone space S in the rack 10. The zone space S is a space corresponding to the section 13 of the floor 11, and is a space between the neighboring sections 13 in the z direction (see FIG. 3). That is, each zone space S is a space in which the one storage bin 20 is stored, and is a minimum unit space making up the storage area 14, and each zone space S is a minimum unit space making up the movement route 15. Note that, although part of components is shared between the neighboring rack modules 2, the shared components are also components of each rack module 2.

Figure 12A:
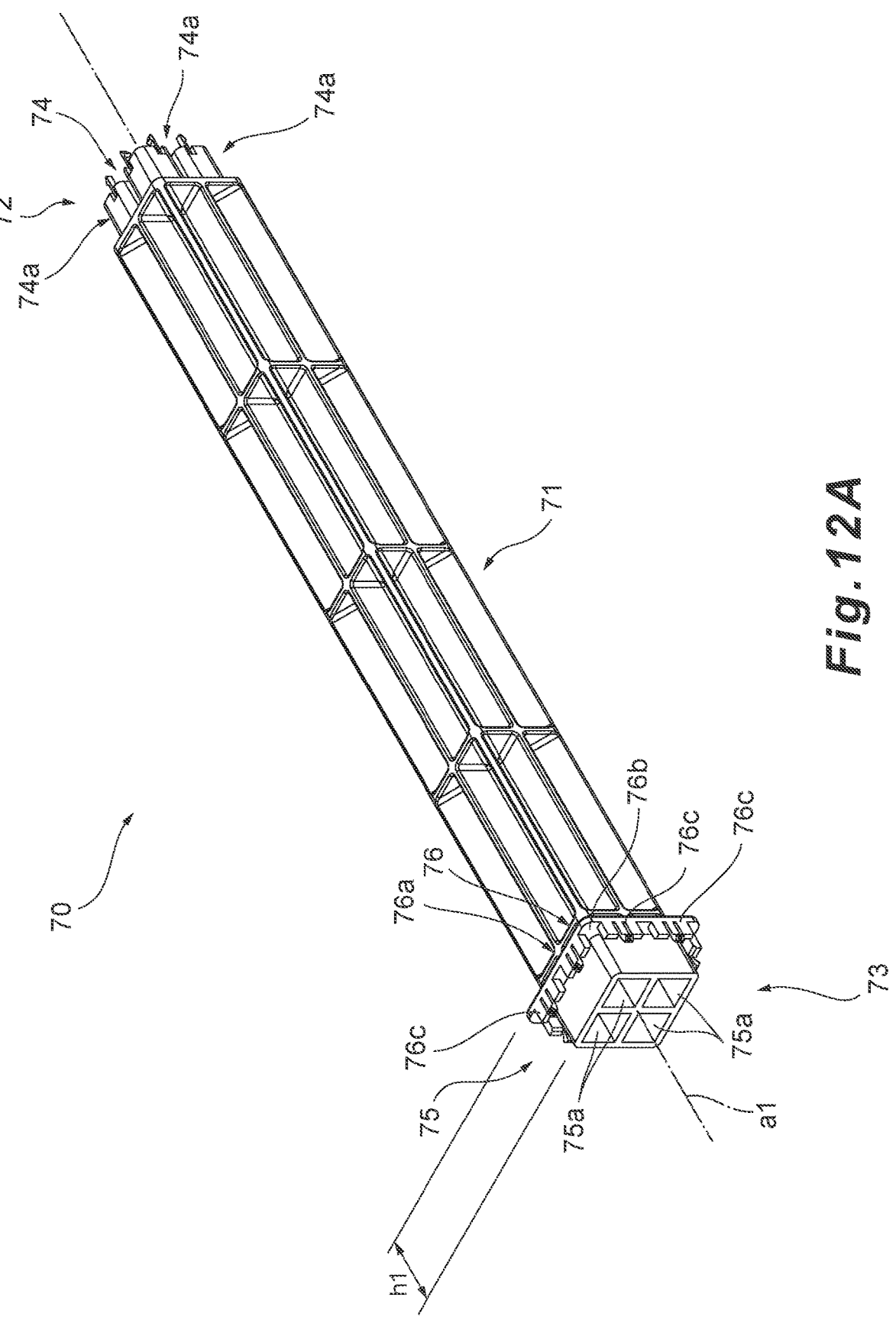
FIGS. 12A and 12B are perspective views of a support column module 70 included in a rack module 2.
Figure 12B:
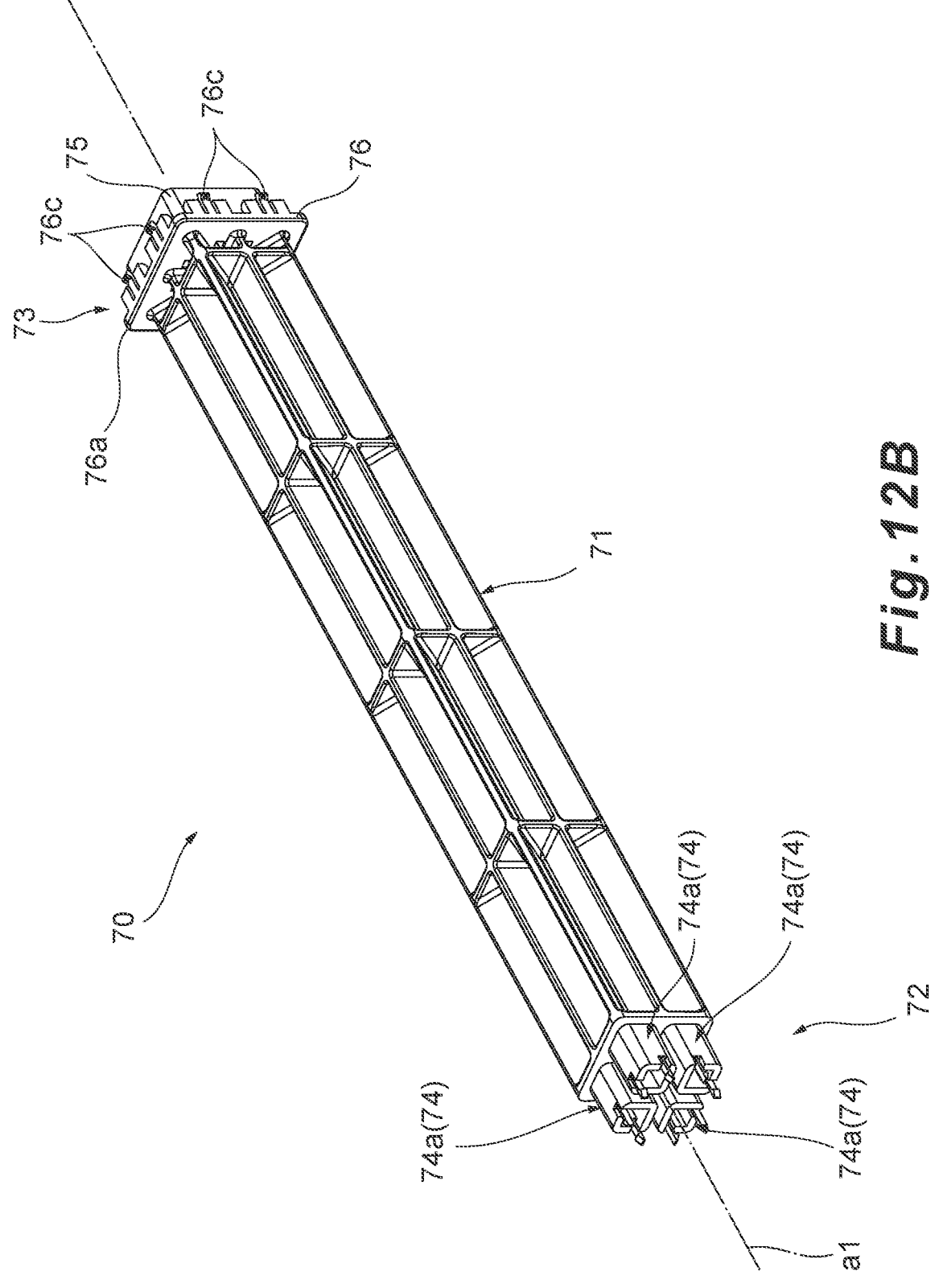
Figure 13:
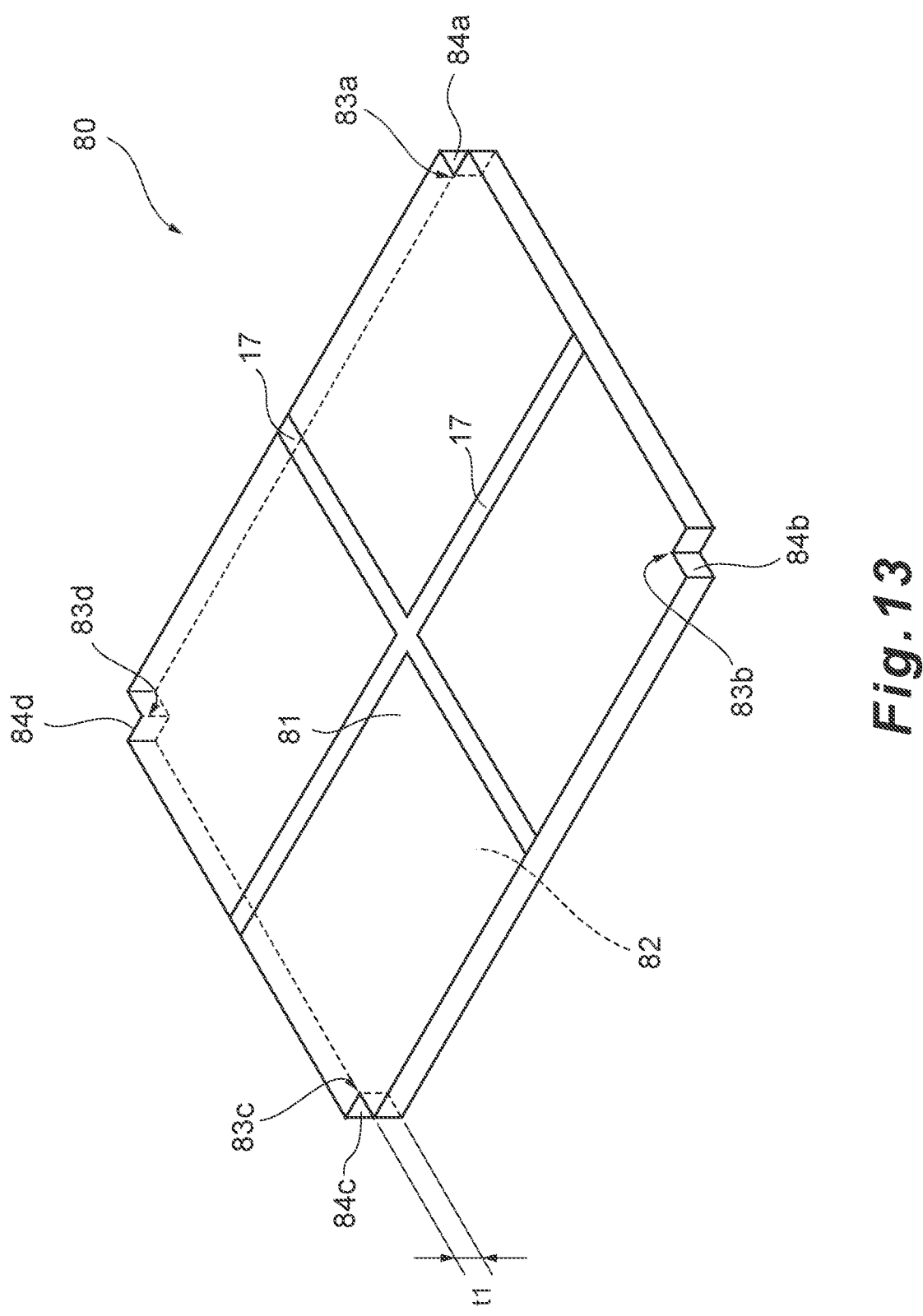
FIG. 13 is a perspective view of the support column module 70 included in the rack module 2.

More specifically, as illustrated in FIG. 11, each rack module 2 includes part of the eight respective support column modules 70 and the floor module 80. FIGS. 12A and 12B are perspective views of the support column module 70. FIG. 13 is a perspective view of the floor module 80. As illustrated in FIGS. 12A and 12B, the support column module 70 is a member having a columnar shape extending in an axial line a1 direction and has rigidity, and includes a main body 71, an insertion plug 72, and an accommodation plug 73. The main body 71 is, for example, a bar-shaped member whose axis a1 extends as a center axis or a sub-stantial center axis.

The insertion plug 72 is connected to one end in an axis a1 direction of the main body 71 at which an insertion part 74 protruding toward one side of the axis a1 direction is formed. The insertion part 74 includes four insertion pro-trusion parts 74a which are, for example, parts protruding in the axis a1 direction. The insertion protrusion parts 74a are arranged at equal intervals with the axis a1 arranged at the center, and for example, the two insertion protrusion parts 74*a* are respectively aligned in a direction perpendicular to the axis al to form two rows of the insertion protrusion parts 74*a*. These two rows face each other. Note that the number of the insertion protrusion parts 74*a* provided at the insertion plug 72 is not limited to four, and may be one or other plural numbers. The number of the insertion protrusion parts 74*a* provided at the insertion plug 72 is determined to match with, for example, the number of accommodation recess parts 75*a* of the accommodation plug 73 described below. Each insertion part 74*a* has, for example, a cylindrical shape extending along the axis al, and, more specifically, has, for example, a square cylindrical shape whose corner edge is a curved surface having an arc-shaped cross section.

The accommodation plug 73 is connected with an other end in the axis al direction of the main body 71, and the insertion plug 72 and the accommodation plug 73 of the support column module 70 oppose to each other in the axis al direction. The accommodation plug 73 includes an accommodation part 75, and the accommodation part 75 can accommodate the insertion part 74 of the insertion plug 72 of the support column module 70. More specifically, the accommodation part 75 includes the four accommodation recess parts 75*a* which can respectively accommodate the four insertion protrusion parts 74*a* of the insertion part 74 of the insertion plug 72. The accommodation recess part 75*a* has a shape matching the insertion protrusion part 74*a*, and is a recess part which is recessed toward the insertion plug 72 in the axis al direction. Each accommodation recess part 75*a* can accommodate the corresponding insertion protrusion part 74*a*. Each accommodation recess part 75*a* may be able to accommodate the corresponding insertion protrusion part 74*a* by clearance fit, accommodate the corresponding insertion protrusion part 74*a* by stationary fit, or accommodate the corresponding insertion protrusion part 74*a* by transition fit. Note that the number of the accommodation recess parts 75*a* provided to the accommodation plug 73 is not limited to four, and may be one or other plural numbers. The number of the insertion protrusion parts 74*a* provided to the insertion plug 72 may be determined according to, for example, the number of the floor modules 80 supported by the support column modules 70.

Furthermore, the accommodation plug 73 is formed with a floor reception part 76 around the accommodation part 75. The floor reception part 76 is a part supporting the floor module 80 in the axis al direction. The floor reception part 76 includes a flange part 76*a* forming a face (floor reception face 76*b*) extending along a plane perpendicular to the axis al, and engagement protrusion parts 76*c* protruding from the flange part 76*a* to a side opposite to the main body 71 in the axis al direction. The floor reception face 76*b* extends in parallel to the plane perpendicular to the axis al. The engagement protrusion part 76*c* has a shape which can engage with a corresponding part. The accommodation part 75 protrudes from the flange part 76*a* of the floor reception part 76 toward a side opposite to the main body 71 in the axis al direction. A height h1 of the accommodation part 75 is a thickness t1 (see FIG. 13) of the floor module 80 or more. Note that the height h1 of the accommodation part 75 is a distance in the axis al direction between the floor reception face 76*b* of the flange part 76*a* and a distal end face of the accommodation part 75. Note that the height h1 of the accommodation part 75 may be smaller than the thickness t1 of the floor module 80.

The main body 71, the insertion plug 72, and the accommodation plug 73 are parts of the support column module 70 which are integrally formed by the same material, and the main body 71, the insertion plug 72, and the accommodation plug 73 are integrally formed. A material of the support column module 70 is, for example, a resin. The material of the support column module 70 is not limited to the resin, and may be, for example, metal.

The support column module 70 employs the above-described configuration, and the two support column modules 70 are coupled to each other by accommodating and bonding the insertion plug 72 of the one support column module 70 in and to the accommodation plug 73 of the other support column module 70. On the other hand, the two support column modules 70 coupled as described above are detached by pulling the insertion plug 72 of the one support column module 70 from the accommodation plug 73 of the other support column module 70. The plurality of support column modules 70 are coupled in this way, so that the one support column 12 can be formed. When the support column modules 70 are coupled, each insertion protrusion part 74*a* fits to the corresponding accommodation recess part 75*a*. Consequently, it is possible to increase coupling strength between these support column modules 70, and increase strength of the support column 12. On the other hand, as described above, it is possible to decouple the support column modules 70 of the support column 12.

As illustrated in FIG. 13, the floor module 80 is a plate-like member corresponding to the one section 13 of the floor 11, and includes a surface 81 which is a face on which the section 13 is formed. The floor module 80 includes a plurality of corner portions. As described above, the section 13 defines, for example, the outline of the square or the rectangle in plan view, and, similarly, the floor module 80 defines, for example, an outline of a square and a rectangle in plan view and includes four corner portions 83*a* to 83*d*. The thickness t1 of the floor module 80 is a distance between the surface 81 and a back surface 82 which is a face opposing to the surface 81. The corner portions of the floor module 80 can be supported by the accommodation plugs 73 of the support column modules 70. For example, the floor module 80 has a structure that the floor modules 80 the number of which is the same as the number of the corner portions included in the floor module 80 can be detachably supported by the accommodation part 75 and the floor reception part 76 of the one accommodation plug 73. Note that the floor module 80 may have a structure that the floor modules 80 the number of which is different from the number of corner portions included in the floor module 80 can be supported by the accommodation part 75 and the floor reception part 76 of the one accommodation plug 73.

Respectively at the four corner portions 83*a* to 83*d* of the floor module 80, cutout faces 84*a* to 84*d* are formed. Note that the corner portions 83*a* to 83*d* are aligned clockwise in order in plan view. The cutout faces 84*a* to 84*d* are each a part defining, at each of the corner portions 83*a* to 83*d*, a space recessed in an extension direction of the floor module 80, and is a face facing this space. When the four floor modules 80 are annularly aligned facing the same direction such that the surfaces 81 are coplanar, the cutout faces 84*a* to 84*d* of the four respective floor modules 80 form through-holes surrounding outer circumferential surfaces of the accommodation parts 75. That is, the cutout face 84*a* of the one floor module 80, the cutout face 84*b* of the one floor module 80, the cutout face 84*c* of the one floor module 80, and the cutout face 84*d* of the one floor module 80 are annularly aligned in this order. According to, for example, the number of the corner portions of the floor module 80, the number of the floor modules 80 supported by the one accommodation plug 73, or the like, the one cutout face may be a face corresponding to a part of a predetermined size of the outer circumferential surface of the accommodation part 75.

Furthermore, on the surface 81 of the floor module 80, the two lines 17 intersecting at a center or a substantial center of the surface 81 is provided. For example, the two lines 17 are perpendicular or substantially perpendicular to each other. As described above, the transportation robot 30 can run along the lines 17 or stop on the line 17 by tracing these lines 17. Note that, although the floor module 80 is the plate-like member, the floor module 80 may be solid or have a cavity inside. For example, the floor module 80 may be formed by stretching a plate-like surface member on a surface of a framework assembled in a grid pattern. Furthermore, the number of the corner portions 83 of the floor module 80 is not limited to four, and the shape of the floor module 80 in plan view is not limited to the square or the rectangle, and may be other shapes such as other polygons and circles.

Figure 14:
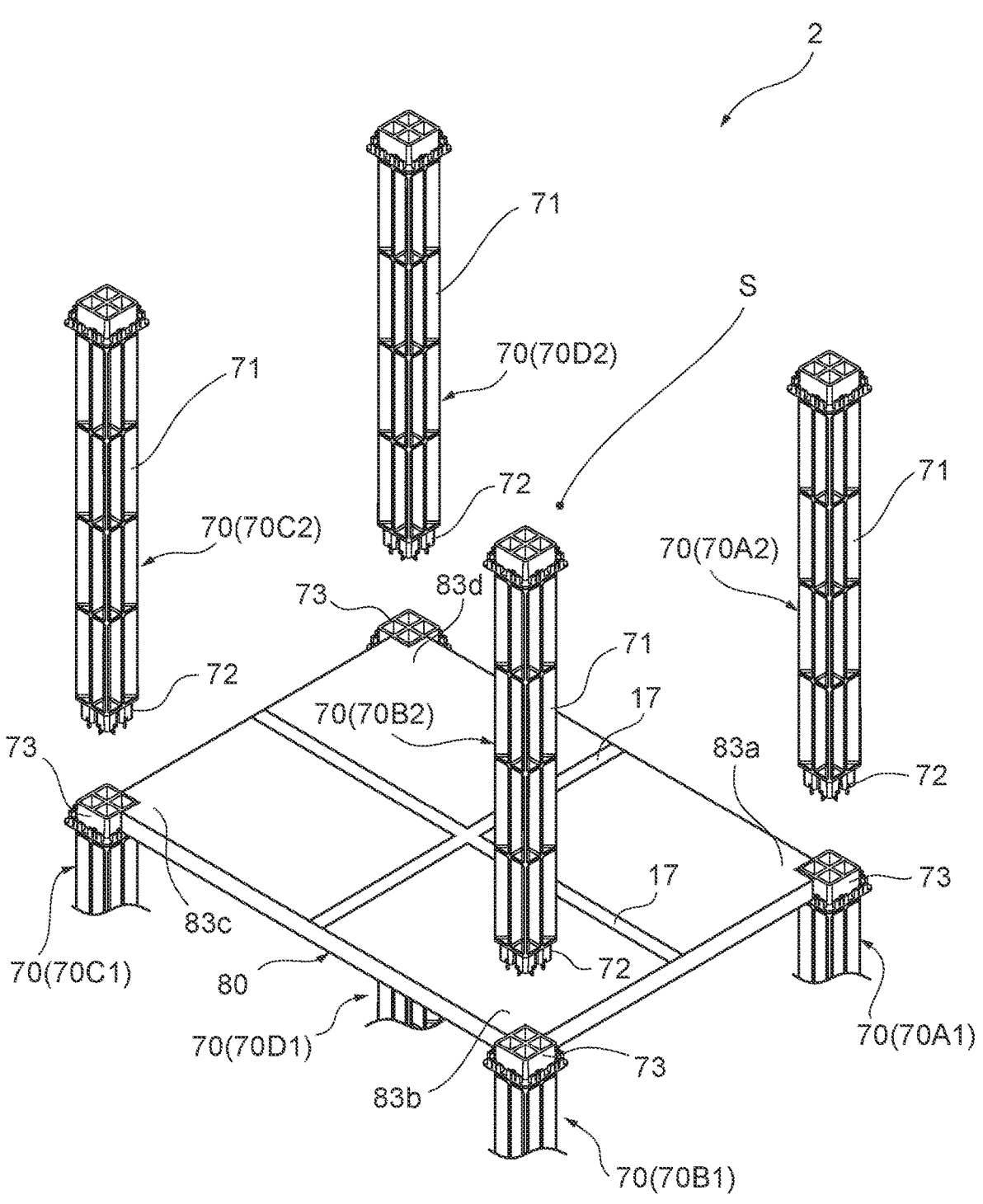
FIG. 14 is a partial exploded perspective view of the rack module 2.
Figure 15:
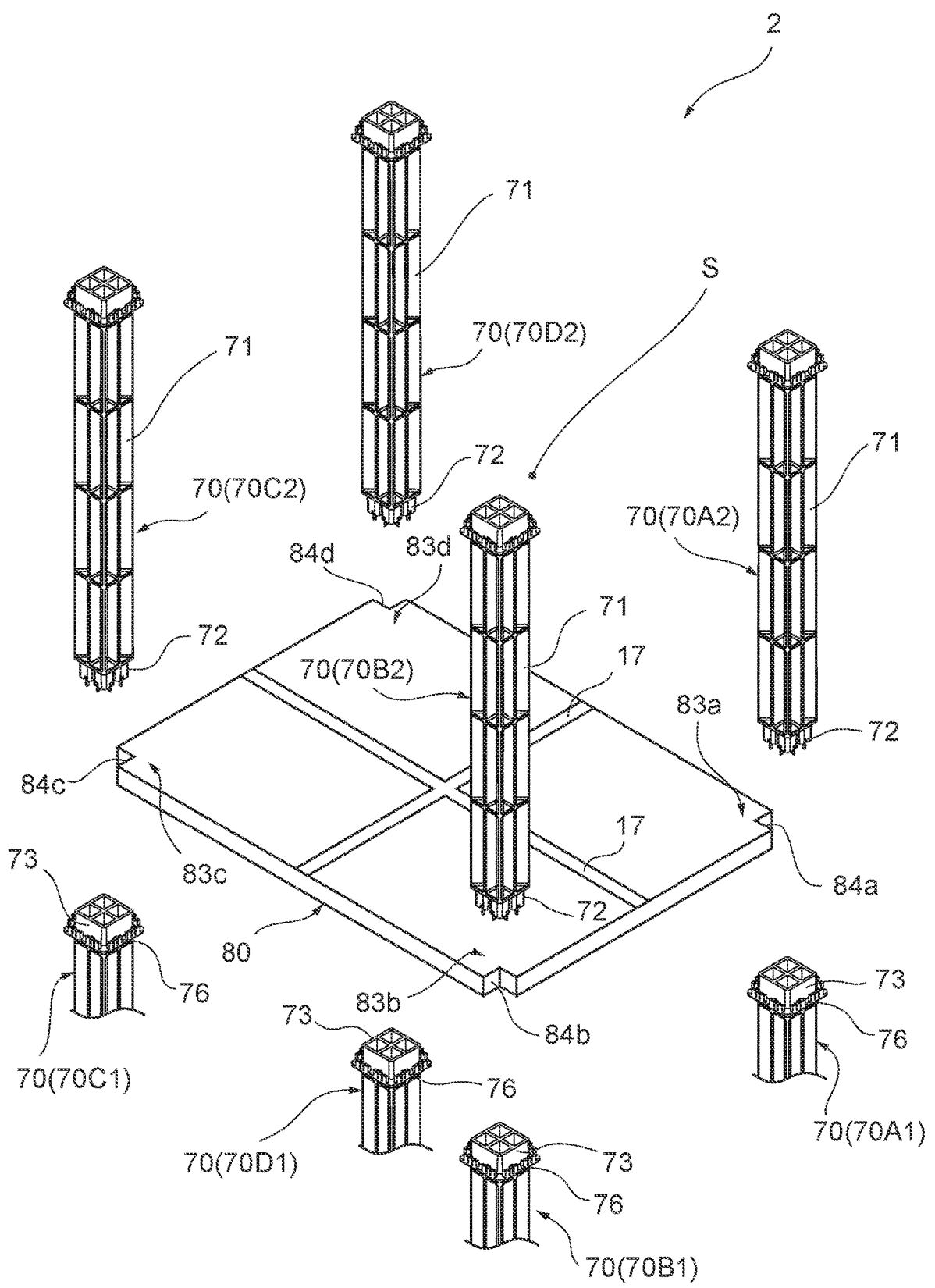
FIG. 15 is a partial exploded perspective view of the rack module 2.

As illustrated in FIGS. 11, 14, and 15, the rack module 2 includes the respective accommodation plugs 73 of the four support column modules 70 meeting the four corner portions 83*a* to 83*d* of the floor module 80, the respective main bodies 71 and insertion plugs 72 of the other four support column modules 70 respectively coupled to the accommodation plugs 73 of these four support column modules 70, and the one floor module 80. Note that FIGS. 14 and 15 are exploded perspective views of the rack module 2, FIG. 14 illustrates that the four support column modules 70 and the other four support column modules 70 are detached, and FIG. 15 further illustrates that the respective accommodation plugs 73 of the four support column modules 70 are detached from the floor module 80. In the rack module 2, the respective accommodation plugs 73 of the four support column modules 70 are perpendicular or substantially perpendicular to the surface 81 of the floor module 80, and respectively support the floor module 80 at the four corner portions 83*a* to 83*d*.

More specifically, in the rack module 2, the accommodation plug 73 of one support column module 70A1 among the four support column modules 70 supports the floor module 80 at the corner portion 83*a* of the floor module 80. More specifically, the corner portion 83*a* of the floor module 80 comes into contact with part of the floor reception face 76*b* of the floor reception part 76 of the accommodation plug 73, and the floor module 80 is supported by the support column module 70A1 at the corner portion 83*a*. Part of the floor reception face 76*b* coming into contact with the corner portion 83*a* of the floor module 80 is a part of the floor reception face 76*b* facing the one accommodation recess part 75*a* of the accommodation plug 73. Furthermore, the engagement protrusion part 76*c* of the floor reception face 76*b* is accommodated in a recess part (not illustrated) of the corner portion 83*a* of the floor module 80. Furthermore, the insertion plug 72 of one support column module 70A2 among the four other support column modules 70 is inserted in the accommodation plug 73 of the support column module 70A1, and the support column module 70A2 is coupled to the support column module 70A1.

Similarly, the respective accommodation plugs 73 of support column modules 70B1, 70C1, and 70D among the four support column modules 70 support the floor module 80 at the corner portions 83*b*, 83*c*, and 83*d* of the floor module 80. Furthermore, the respective insertion plugs 72 of support column modules 70B2, 70C2, and 70D2 among the other four support column modules 70 are inserted into the accommodation plugs 73 of the support column modules 70B1, 70C1, and 70D1, and the support column modules

70B2, 70C2, and 70D2 are coupled to the support column modules 70B1, 70C1, and 70D1, respectively. Thus, each floor module 80 can be attached to the support column modules 70 from an upper side to a lower side in the z axis direction. In other words, each floor module 80 can be detached from the support column modules 70 from the lower side to the upper side in the z axis direction.

As described above, the rack module 2 includes the floor module 80, the accommodation plugs 73 of the respective support column modules 70A1, 70B1, 70C1, and 70D1 supporting the floor module 80, and the respective main bodies 71 and insertion plugs 72 of the support column modules 70A2, 70B2, 70C2, and 70D2 protruding from the surface 81 of the floor module 80. Note that the respective main bodies 71 and insertion plugs 72 of the support column modules 70A2, 70B2, 70C2, and 70D2 of the one rack module 2 are components of the rack module 2 adjacent to this rack module 2 in the rack 10. Thus, the respective main bodies 71 and insertion plugs 72 of the support column modules 70A2, 70B2, 70C2, and 70D2 of the one rack module 2 are components shared with the other rack module 2.

Figure 16A:
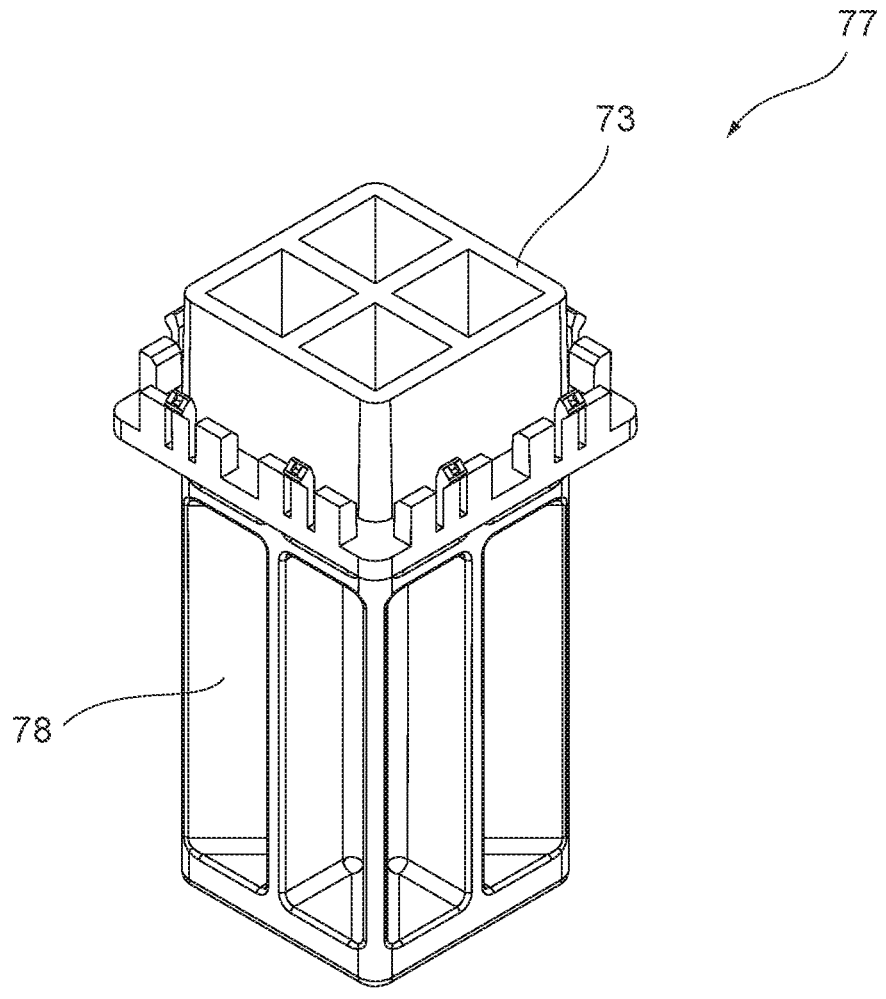
FIGS. 16A and 16B are perspective views of a support column end module 77 included in the rack 10.
Figure 16B:
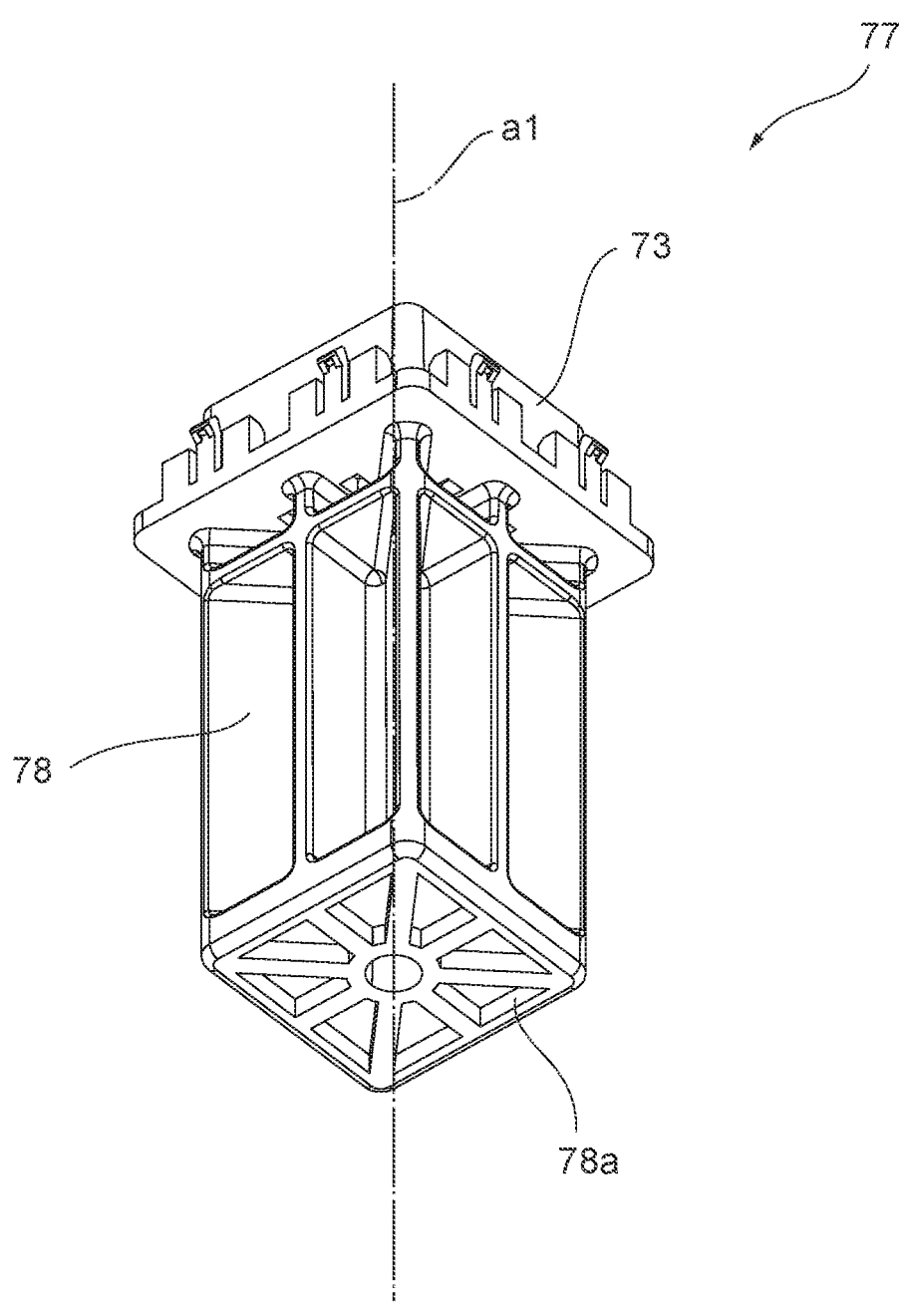

Furthermore, for the rack module 2 making up the lowermost floor 11 in the rack 10, support column end modules 77 illustrated in FIGS. 16A and 16B are used as members supporting the floor module 80 instead of the support column modules 70 (support column modules 70A1, 70B1, 70C1, and 70D1). The support column end module 77 is the same member as part of the accommodation plug 73 side of the support column module 70, and includes the accommodation plug 73 and the main body 78 which is part of the accommodation plug 73 side of the main body 71. An end face 78*a* of the main body 78 is a face which is perpendicular or substantially perpendicular to the axis al.

Furthermore, the other floor module 80 is attached to the rack module 2 making up the uppermost floor 11 or the rack module 2 which is the uppermost part in the rack 10. That is, similar to the floor module 80 of the rack module 2, the other floor module 80 is attached to the flange parts 76*a* of the respective accommodation plugs 73 of the support column modules 70 (support column modules 70A2, 70B2, 70C2, and 70D2) protruding from the surface 81 of the floor module 80.

Figure 17:
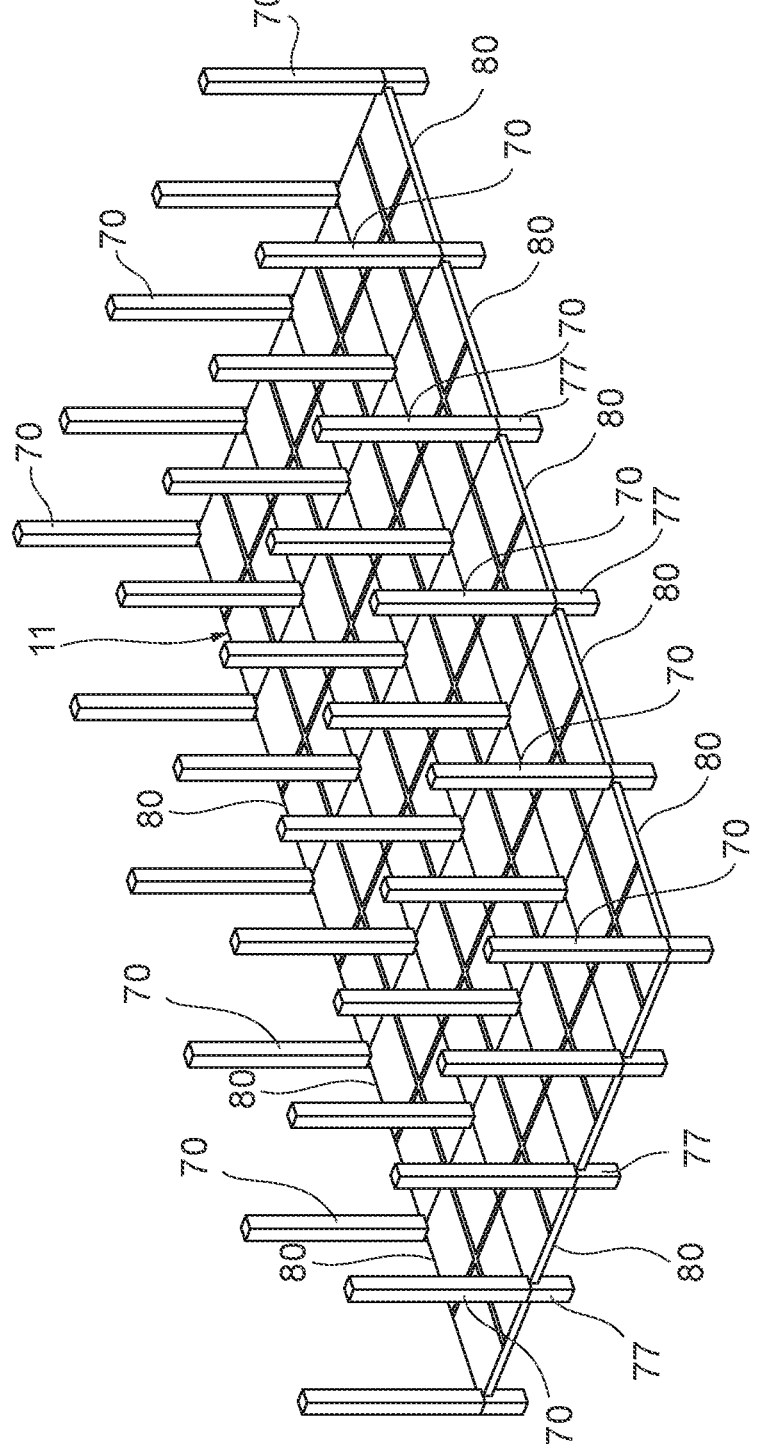
FIG. 17 is a perspective view for explaining a method for assembling the rack 10.

A plurality of the above-described rack modules 2 is used and assembled arbitrarily to form the rack 10. Here, a case where the rack 10 including the floors 11 of the five floors is assumed. As illustrated in FIG. 17, the floor modules 80 are first attached to the plurality of support column end modules 77 aligned on the floor surface from above in the z axis direction. That is, each floor module 80 is supported by the respective support column end modules 77 at the four corners. This attachment is repeated to form the floor 11 of the first floor. Subsequently, the support column modules 70 are respectively coupled to the support column end modules 77, so that the plurality of support column modules 70 vertically stand from the floor 11 of the first floor. The floor modules 80 are attached to the vertically standing support column modules 70 from above. A step of attaching the floor modules 80 to the vertically standing support column modules 70, and a step of further coupling the support column modules 70 to the support column modules 70 are repeated to assemble the floors 11 from the first floor to the fifth floor. This assembly work is performed by operators.

Figure 18:
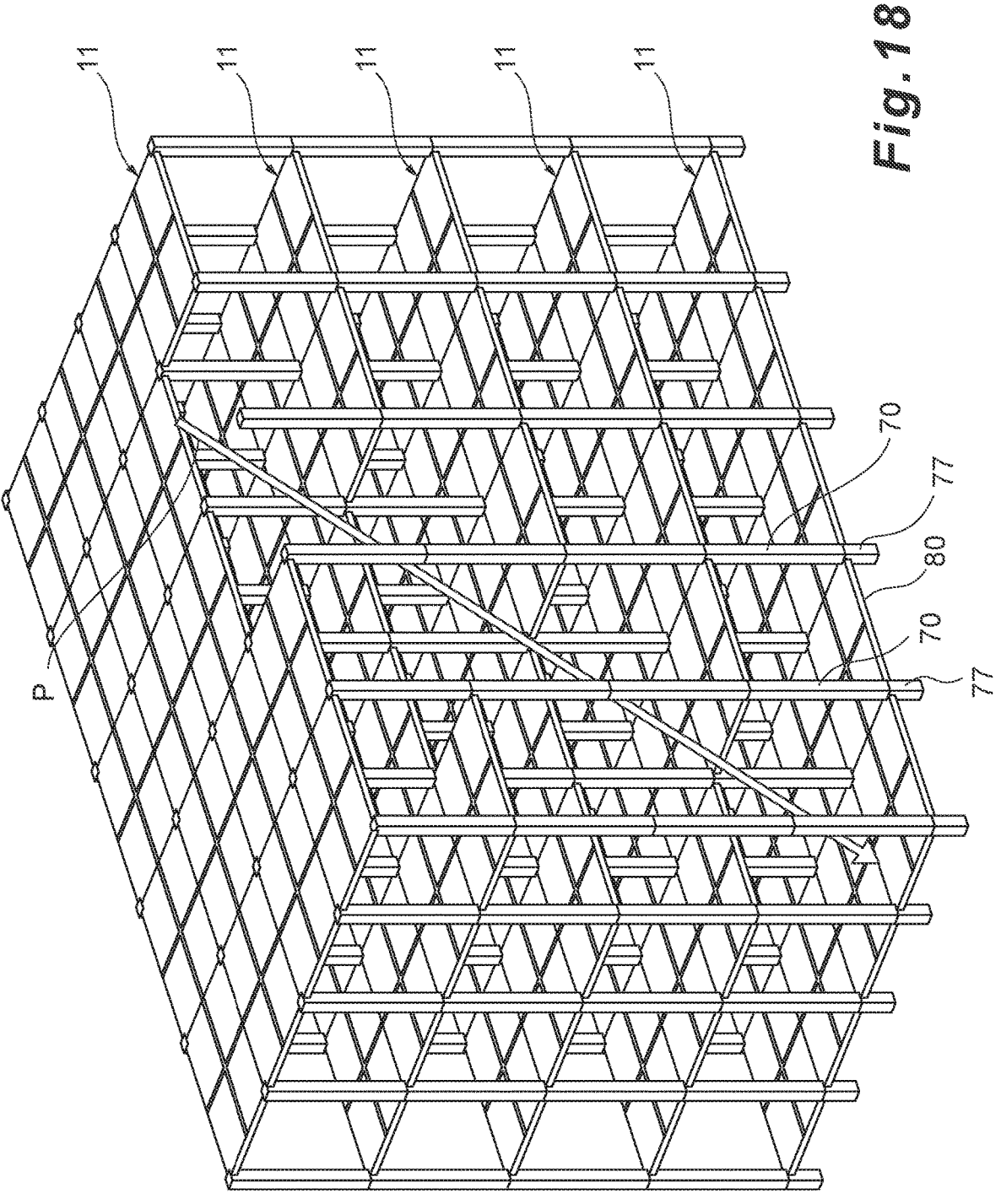
FIG. 18 is a perspective view for explaining the method for assembling the rack 10.

As illustrated in FIG. 18, in the step of assembling the floors 11 from the first floor to the fifth floor, the at least one floor module 80 is detached from the support column modules 70 on each floor 11 to secure a route P for the operators to go down from the floor 11 of the upper floor to the floor 11 of the lower floor. In the present embodiment, for example, the two neighboring floor modules 80 on each floor 11 are detached to allow the operators to go down to the floor 11 of the first floor from the fifth floor. In this regard, the two floor modules 80 are displaced by only a space corresponding to the one floor module 80 toward the horizontal direction between the neighboring floors 11. In the present embodiment, the displacement directions are the same on all of the floors 11 from the first floor to the fifth floor. As a result, as illustrated in FIG. 18, the route P is formed in a step-like shape.

Figure 19:
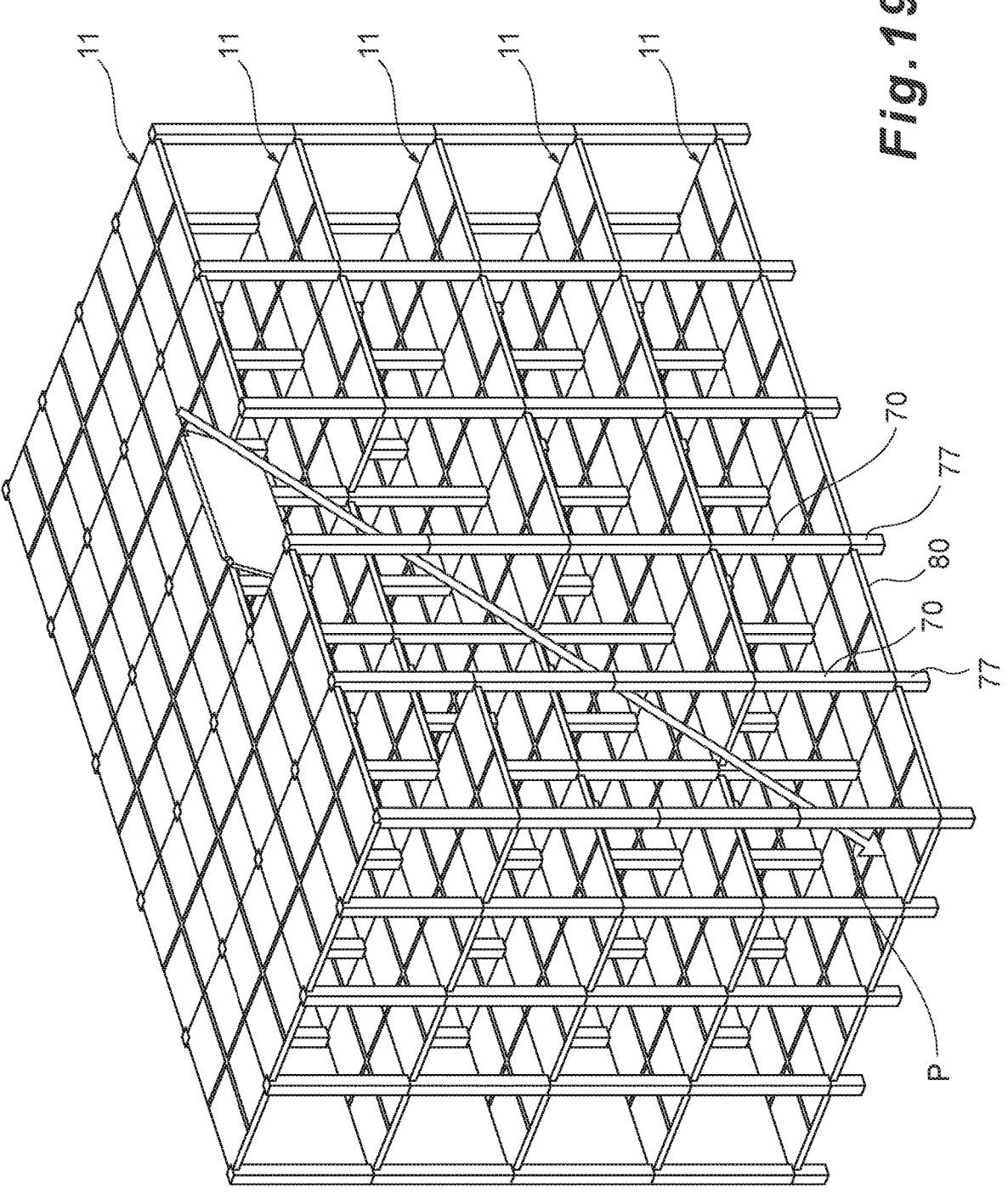
FIG. 19 is a perspective view for explaining the method for assembling the rack 10.
Figure 20:
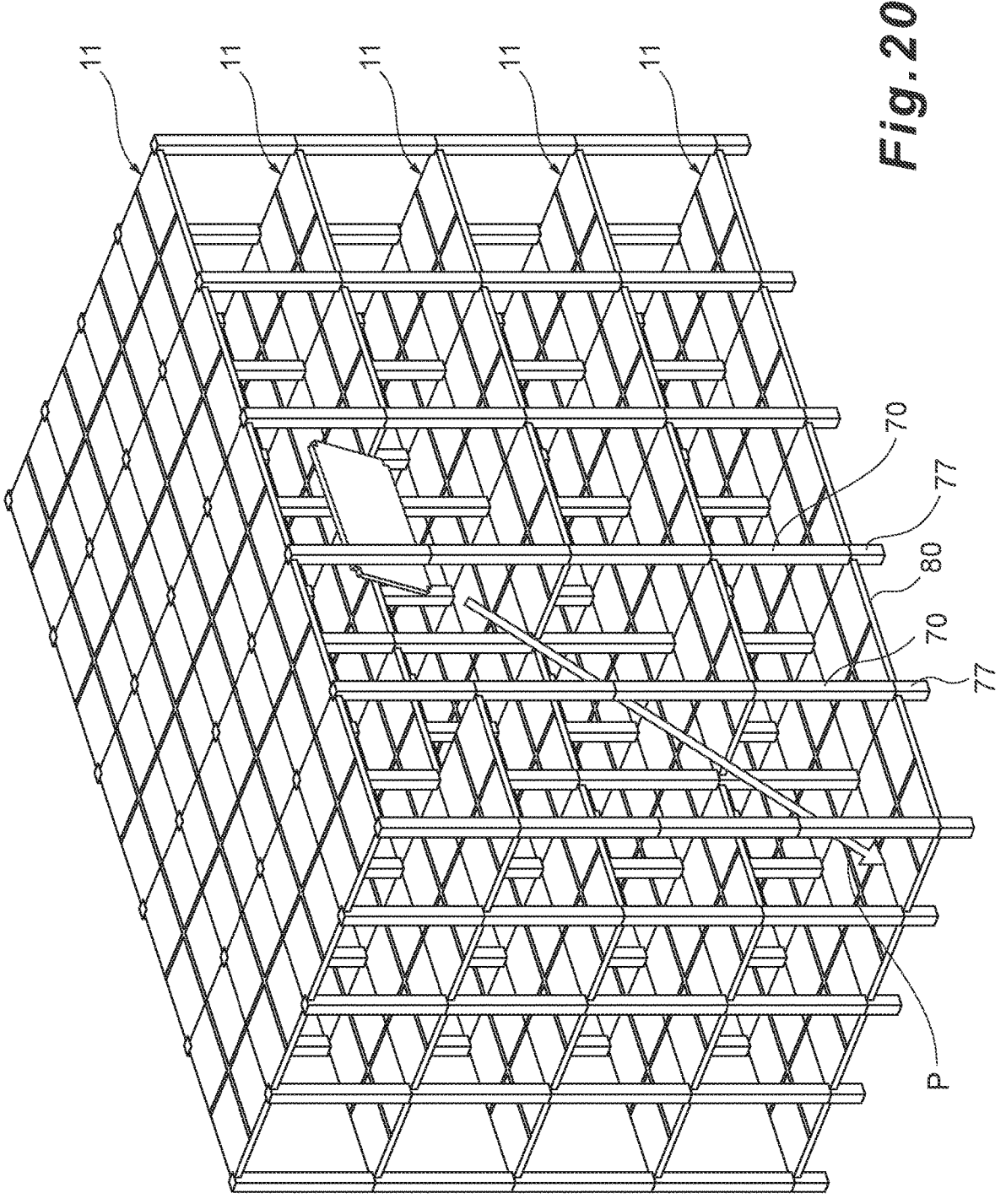
FIG. 20 is a perspective view for explaining the method for assembling the rack 10.
Figure 21:
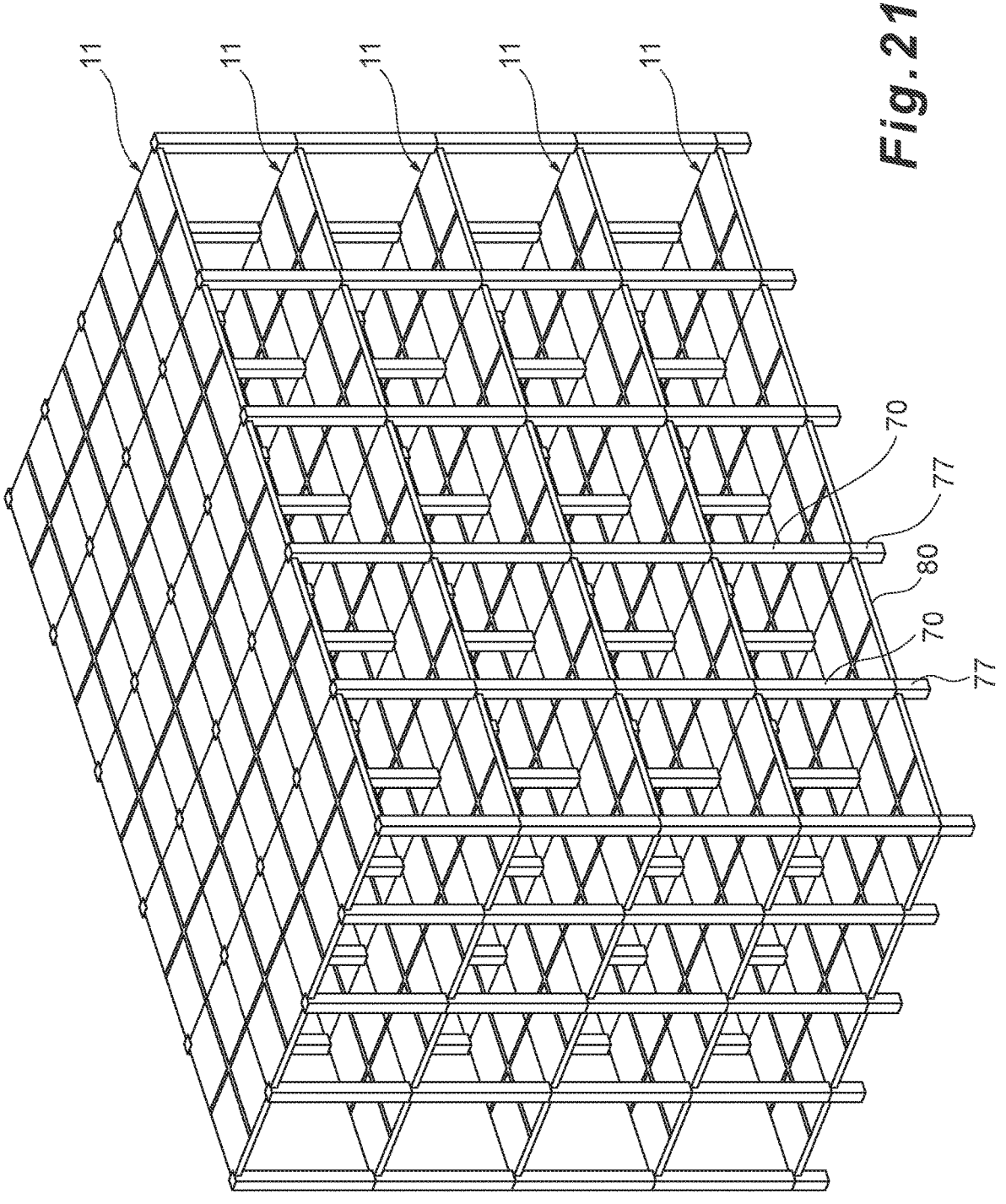
FIG. 21 is a perspective view for explaining the method for assembling the rack 10.

When assembly of the floors 11 up to the fifth floor is completed, the operators pass the route P to go down to the floor 11 of the lower floor from the upper floor. In this case, as illustrated in FIG. 19, at, for example, a time when the operators go down to the floor 11 of the fourth floor, the floor modules 80 detached on the floor 11 of the fifth floor are attached to the support column modules 70. Thus, the route P is closed on the floor 11 of the fifth floor. Subsequently, as illustrated in FIG. 20, at a time when the operators go down to the floor 11 of the third floor from the fourth floor, the floor modules 80 detached on the floor 11 of the fourth floor are attached to the support column modules 70. As illustrated in FIG. 21, as a result of repeating the same work on the third floor and the second floor, too, the route P is closed on all of the floors 11. The operators go outside the rack 10 from the floor 11 of the first floor. Assembly of the rack 10 is completed in this way.

As described above, the rack 10 is assembled from the plurality of rack modules 2. More specifically, for example, the human operators repeat a process of attaching the floor modules 80 to the support column modules 70 to assemble the rack 10 including the floors 11 of a plurality of floors. At this time, the route P for the operators to go down to the floor 11 of the lower floor from the upper floor is secured. After all of the floors 11 are formed, the operators can go down to the first floor, i.e., the ground passing this route P. Consequently, large-scale equipment such as scaffolds and aerial work platforms is not required at all to assemble the rack 10. Furthermore, the route P is closed by the floor modules 80 when the operators go down to the floor 11 of the lower floor from the upper floor. Consequently, it is possible to easily assemble the rack 10.

Furthermore, assembly is easy, so that it is possible to partially form the rack 10 at a place at which the automated storage and retrieval system 1 is installed, and improve installation efficiency of the rack 10. For example, it is possible to disassemble an existing rack, and partially form the rack 10 in a space left as a result of disassembly. Furthermore, it is possible to easily increase the zone spaces S in the existing rack 10, and easily disassemble the rack 10 and easily change a layout. Consequently, when the automated storage and retrieval system 1 causes a failure, it is possible to partially disassemble the rack 10 by detaching the rack module 2, and easily and efficiently repair the automated storage and retrieval system 1. By, for example, detaching the one or more floor modules 80 stepwise on the floors 11 from the first floor to the fifth floor to form the route P in the rack 10, the operators can easily go up to the floor 11 of each floor. Consequently, it is possible to easily and efficiently maintain the automated storage and retrieval system 1.

According to the above rack 10 and assembly method of the rack 10, the route P is formed on the outermost side of the rack 10, yet may be formed, for example, inside the rack 10. Furthermore, the number of the floor modules 80 to be detached may be, for example, one or may be three or more according to the sizes of the support column modules 70 and the floor modules 80. Furthermore, positions to detach the floor modules 80 only need to be displaced between the neighboring floors 11, and displacement may correspond to, for example, the two or more floor modules 80. Furthermore, the positions to detach the floor modules 80 may not necessarily need to be displaced in the same direction between the plurality of floors 11, and may be displaced in, for example, a same first direction on the fifth floor to the third floor and in a second direction opposite to the first direction on the third floor to the first floor.

This description discloses some embodiments of the subject matter of the present disclosure, and uses examples to enable the one of ordinary skilled in the art to carry out the embodiments of the subject matter of the present disclosure including manufacturing and using an arbitrary device and system and executing an arbitrary incorporated method. The patentable scope of the subject matter of the present disclosure is defined by the claims, and may include other examples achieved by the one of ordinary skilled in the art. These other examples intend to be within the claims in a case where the other examples include components which are not different from wordings of the claims, or in a case where the other examples include equivalent components including non-substantial differences from the wordings of the claims.

The invention claimed is:

1. A rack comprising:
a plurality of floors each of which stores a plurality of bins for containing items, and allows a transportation robot to run along a surface thereof; and
a plurality of support columns supporting the floors, each of the plurality of support columns having a main body, an insertion plug at one end of the main body and an accommodation plug at another end of the main body opposite to the insertion plug,
wherein each of the plurality of floors includes a plurality of floor modules making up part of each of the floors, and each of the floor modules is detachably supported by the accommodation plug with a floor reception part;
wherein at least one of the floor modules is detachable from the support columns of each floor to secure a route for an operator to go down to a lower floor from an upper floor of the plurality of floors.

2. The rack according to claim 1, wherein the floor module can be detached upward from the support column.

3. The rack according to claim 1, wherein each of the support columns extends between at least mutually neighboring ones of the floors, and each support column can be coupled to another of the support columns in a vertical direction.

4. The rack according to claim 1, wherein one of the support columns supports corner portions of the plurality of floor modules.

5. The rack according to claim 1, wherein at least one floor module is attachable to the support column on each floor to close the route after the operator goes down to the lower floor from the upper floor.

6. The rack according to claim 1, wherein the surface of each of the plurality of the floors is defined with movement routes for the transportation robots to run.

7. The rack according to claim 1, comprising a picking station at an edge of one of the floors,
wherein, the picking station is configured to pick the item from the plurality of bins transported by the transportation robot.

8. The rack according to claim 7, wherein the picking station is defined with picking positions at which the transportation robots transporting the bins are simultaneously aligned to enable the operator to pick work of the item from the bin.

9. The rack according to claim 1, wherein each of the plurality of floors is defined with a plurality of charging spots adapted to charge a battery of the transportation robot.

10. The rack according to claim 1, wherein each of the plurality of floors defines a plurality of sections.

11. The rack according to claim 10, wherein each of the plurality of sections is configured to create an outline adapted to receive the transportation robot and the bin.

12. The rack according to claim 10, wherein each of the plurality of floors defines a storage area including the section.

13. A method for assembling the rack according to claim 9, the method comprising steps of:

assembling each of the floors from a lowest floor to an uppermost floor by attaching the floor modules to the support columns; and detaching the at least one floor module from the support columns on each of the floors to secure the route for the operator to go down to the lowest floor from the uppermost floor in the assembling step.

14. The method for assembling the rack according to claim 13, further comprising a step of closing the route by the detached floor module on the uppermost floor when the operator goes down from the uppermost floor to the lowest floor when assembly of all of the floors is completed.

15. The method for assembling the rack according to claim 13, wherein a position of the detached floor module is displaced in a horizontal direction from a position of the floor module detached on the respective floor above the uppermost floor.

16. The method for assembling the rack according to claim 15, wherein the displacement in the horizontal direction corresponds to a space of the one floor module.

17. The method for assembling the rack according to claim 15, wherein the route is formed in a step-like shape.

18. The method for assembling the rack according to claim 13, wherein the floor module can be detached upward from the support column.

19. The method for assembling the rack according to claim 13, wherein each of the support columns extends between at least mutually neighboring ones of the floors, and each support column can be coupled to another of the support columns in a vertical direction.

20. The method for assembling the rack according to claim 13, wherein each support column supports corner portions of the plurality of floor modules.

* * * * *